(12) United States Patent
Ibrahim et al.

(10) Patent No.: US 10,732,682 B2
(45) Date of Patent: *Aug. 4, 2020

(54) DC-BASED PEER-TO-PEER NETWORK FOR AIRCRAFT

(71) Applicant: The Boeing Company, Chicago, IL (US)

(72) Inventors: Yakentim M. Ibrahim, Brier, WA (US); Kevin S. Callahan, Shoreline, WA (US)

(73) Assignee: THE BOEING COMPANY, Chicago, IL (US)

( * ) Notice: Subject to any disclaimer, the term of this patent is extended or adjusted under 35 U.S.C. 154(b) by 248 days.

This patent is subject to a terminal disclaimer.

(21) Appl. No.: 15/873,121

(22) Filed: Jan. 17, 2018

(65) Prior Publication Data

US 2018/0143676 A1    May 24, 2018

Related U.S. Application Data

(63) Continuation of application No. 14/575,890, filed on Dec. 18, 2014, now Pat. No. 9,910,469.

(51) Int. Cl.
*G06F 1/26* (2006.01)
*B64D 11/00* (2006.01)
(Continued)

(52) U.S. Cl.
CPC ............ *G06F 1/26* (2013.01); *B64D 11/0015* (2013.01); *G05B 19/042* (2013.01);
(Continued)

(58) Field of Classification Search
None
See application file for complete search history.

(56) References Cited

U.S. PATENT DOCUMENTS

| 3,795,771 A | 3/1974 | Gundersen et al. |
| 6,272,572 B1 | 8/2001 | Backhaus et al. |

(Continued)

OTHER PUBLICATIONS

"Lou Frenzel", "What's the Difference Between The RS-232 and RS-485 Serial Interfaces?", Apr. 16, 2013, ElectronicDesign, pp. 1-11 (Year: 2013).*

(Continued)

*Primary Examiner* — Santosh R Poudel
(74) *Attorney, Agent, or Firm* — Parsons Behle & Latimer

(57) ABSTRACT

A passenger control unit (PCU) network is provided for a passenger aircraft having passenger seats in a plurality of zones, each zone having at least one column of seats, and each column having at least one row of seats. The PCU network includes a direct current (DC) power distribution system, and a plurality of wired PCUs, one PCU associated with each passenger seat and coupled to the DC power distribution system. Each PCU has a processor and system memory and a standard data and power interface, the processor being programmed for differential peer-to-peer communication with adjacently interconnected PCUs throughout the PCU network and with an external system of the aircraft. A PCU of one seat of each row is serially coupled to all PCUs in the respective row, and designated as a row master PCU; a PCU of one seat of each column is serially coupled to all row master PCUs in the respective column, and designated as a column master PCU; a PCU of one seat of each zone is serially coupled to all column master PCUs in the respective zone, and designated as a zone master PCU; and one zone master PCU is designated as a PCU system master and connected to an external system. Two-conductor data wires couple all PCUs within the PCU network.

20 Claims, 11 Drawing Sheets

(51) Int. Cl.
*G05B 19/042* (2006.01)
*H04L 29/08* (2006.01)

(52) U.S. Cl.
CPC .. *H04L 67/1078* (2013.01); *G05B 2219/2639* (2013.01); *Y02T 50/46* (2013.01)

(56) References Cited

U.S. PATENT DOCUMENTS

| | | | |
|---|---|---|---|
| 6,813,777 | B1 | 11/2004 | Weinberger et al. |
| 7,330,514 | B1 | 2/2008 | Ahmad |
| 7,522,036 | B1 | 4/2009 | Preuss et al. |
| 9,241,137 | B2 | 1/2016 | Frisco et al. |
| 9,509,937 | B2 | 11/2016 | Easterling et al. |
| 2006/0004505 | A1* | 1/2006 | Christiansen ...... G05B 19/0421 701/49 |
| 2006/0132065 | A1 | 6/2006 | Sears et al. |
| 2006/0143662 | A1 | 6/2006 | Easterling et al. |
| 2006/0234700 | A1 | 10/2006 | Funderburk et al. |
| 2007/0057576 | A1 | 3/2007 | Lee |
| 2007/0061847 | A1 | 3/2007 | Callahan et al. |
| 2008/0026284 | A1 | 1/2008 | Fujii |
| 2008/0126630 | A1* | 5/2008 | Farkas ...................... G06F 1/26 710/69 |
| 2009/0225779 | A1 | 9/2009 | Diab et al. |
| 2009/0268609 | A1 | 10/2009 | Koch et al. |
| 2009/0273463 | A1 | 11/2009 | Morwood et al. |
| 2011/0107345 | A1 | 5/2011 | Al-kadi et al. |
| 2011/0148664 | A1 | 6/2011 | Shiomori et al. |
| 2013/0096772 | A1 | 4/2013 | Ibrahim |
| 2014/0040711 | A1 | 2/2014 | Brownlow et al. |
| 2014/0103706 | A1 | 4/2014 | Agusti Costa et al. |
| 2014/0254756 | A1 | 9/2014 | Tagawa |
| 2015/0375865 | A1 | 12/2015 | Fischer et al. |

OTHER PUBLICATIONS

"Scott Thornton", "What is differential signaling?", Feb. 7, 2017, Microcontroller Tips, p. 1 (Year: 2017).*
European Patent Office; European Search Report; European Patent Application No. 15200307.5; dated May 6, 2016.
US Patent and Trademark Office; Notice of Allowance; U.S. Appl. No. 14/575,890 dated Nov. 16, 2017.
US Patent and Trademark Office; Office Action; U.S. Appl. No. 14/575,890 dated Apr. 20, 2017.
ARING 628P3, Nov. 12, 2010, AINC, https://global.ihs.com/doc_detail.cfm?document_name=ARINC%20628P3&item_s_key=00257114.

* cited by examiner

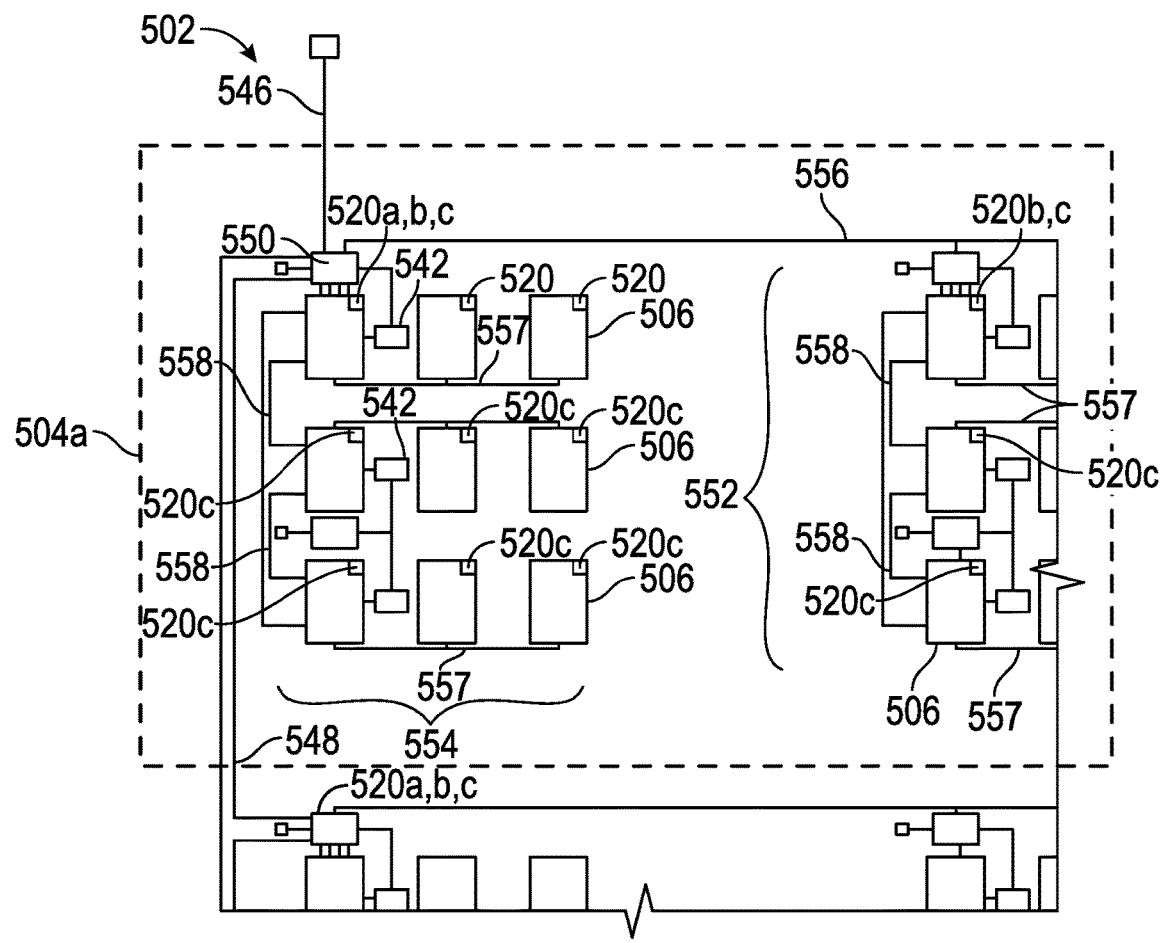
FIG. 7
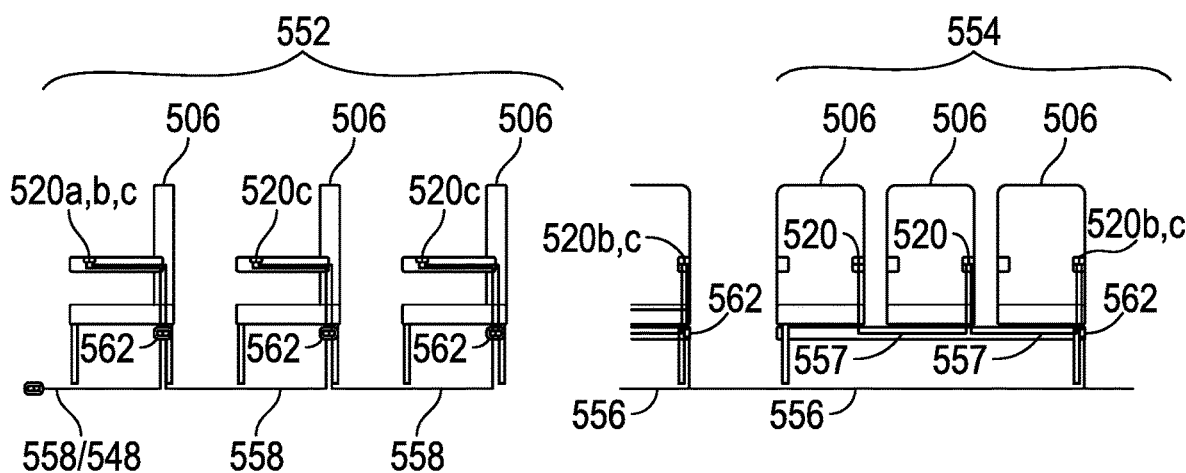
FIG. 8          FIG. 9

DC-BASED PEER-TO-PEER NETWORK FOR AIRCRAFT

CROSS-REFERENCE TO RELATED APPLICATIONS

This application is a continuation of and claims priority to U.S. patent application Ser. No. 14/575,890 filed on Dec. 18, 2014, published as U.S. Patent App. Publication No. 2016/0179151 and entitled "DC-Based Peer-to-Peer Network for Aircraft," the contents of which are hereby incorporated by reference herein.

FIELD OF THE DISCLOSURE

The present disclosure is related to data networks and passenger services systems in aircraft. More particularly, the present disclosure provides a DC-based peer-to-peer network for cabin and passenger services systems that reduces the size, weight and complexity while retaining desired functionality.

BACKGROUND

Commercial aircraft typically include a cabin services system (CSS) that includes control of Call Lights, Reading Lights, and signage (e.g., FASTEN SEAT BELTS and NO SMOKING signs). Other cabin services can also be provided that enhance the passenger experience, including In-Flight Entertainment Systems (IFES), including music and video (e.g. flip-down or seatback screens), Internet connectivity, seat-to-seat communication and USB charging for personal electronic devices at each passenger seat.

The Passenger Services System (PSS) is the function that provides a passenger control of his or her reading light and call light. The Passenger Service Unit (PSU) located directly above a given seat group contains the lamps for Reading Lights and Call Lights. In narrow body aircraft, the control input for the PSS function is physically integrated with PSUs since the PSU is within arm's reach of passengers. On Twin Aisle aircraft, the control input for the PSS function is implemented in the IFES, whereas the light control for the PSU is implemented in the CSS. The IFES handles the control input on Twin Aisle aircraft due the fact that PSUs are not within arm's reach of passengers. Control input events received by the IFES are packaged by the IFES Head End and delivered to the CSS Head End for processing which light the CSS will actuate as a result. The mechanical, electrical, and other components that are involved in the CSS and IFES can be significant in size, weight, volume and complexity. The combination of conventional CSS and IFES systems to implement the PSS function results in significant hardware and cabling for the basic purpose of controlling lights.

A typical IFES consists of Passenger Control Units (PCU) at each seat to receive control input from passengers, Seat Electronic Boxes (SEB) in each Seat Group to route data, Seat Power Modules (SPM) in each Seat Group to convert 115 VAC to 28 VDC, a couple Area Distribution Boxes (ADB) in Each Zone to distribute content to the Seat Groups, Content Servers in the Electronics Bay to serve up entertainment, and a Head End in the Electronics Bay to manage the IFES and interface with the CSS. A typical CSS system consists of overhead Passenger Service Units (PSUs) that accommodate the respective Reading and Call Lights for a seat group, Overhead Electronics Units (OEU) to transform 115 VAC and route discrete signals to Reading and Call Lights in respective PSUs, Zone Management Units (ZMU) that route messages to the OEUs, and a CSS Head End to manage the CSS and interface with the IFES. Seat-to-seat communication traditionally involves data aggregating and power conditioning equipment at each seat. For example, a Seat Electronics Box is typically provided to process high speed Ethernet communication, and Seat Power Modules typically accompany these Seat Electronics Boxes to condition the power for a single Seat Group (i.e. for converting the typical aircraft 115 VAC power supply to DC at each seat).

One challenge associated with this typical configuration is the need for additional hardware for each seat group to service the Passenger Control Unit. Additionally, overhead electronics traditionally service multiple seats, using several discrete wiring segments to fan out to other panels. Running discrete wiring segments between panels tends to limit the features of panels to binary functions, and can involve additional wiring between the Overhead Electronics controller and each panel it serves. All of these issues tend to add weight, cost and complexity to the aircraft.

The present disclosure is directed toward one or more of the above-referenced issues.

SUMMARY

In accordance with one embodiment thereof, the disclosure provides a passenger control unit (PCU) network for a passenger aircraft having passenger seats in a plurality of zones, each zone having at least one column of seats, and each column having at least one row of seats. The PCU network includes a direct current (DC) power distribution system, and a plurality of wired PCUs, one PCU associated with each passenger seat and coupled to the DC power distribution system. Each PCU has a processor and system memory and a standard data and power interface, the processor being programmed for differential peer-to-peer communication with adjacently interconnected PCUs throughout the PCU network and with an external system of the aircraft. A PCU of one seat of each row is serially coupled to all PCUs in the respective row, and designated as a row master PCU; a PCU of one seat of each column is serially coupled to all row master PCUs in the respective column, and designated as a column master PCU; a PCU of one seat of each zone is serially coupled to all column master PCUs in the respective zone, and designated as a zone master PCU; and one zone master PCU is designated as a PCU system master and connected to an external system. Two-conductor data wires couple all PCUs within the PCU network.

In accordance with another embodiment thereof, the disclosure provides an aircraft, including a plurality of passenger seats, arranged into one or more zones, each zone having one or more columns, each column having one or more rows of contiguous seats, and an overhead device associated with each passenger seat. The aircraft also includes a plurality of wired, direct current-(DC) powered passenger control units (PCUs), interconnected to each other with two-conductor data wires in a hierarchical peer-to-peer network, one PCU associated with each passenger seat, each PCU having a processor and system memory and a standard data and power interface, the processor being programmed for differential peer-to-peer communication with adjacently interconnected PCUs throughout the peer-to-peer network. The PCU also includes passenger operable controls for at least the overhead device. Exactly one PCU of each seat row is a row master PCU, coupled to all PCUs in the row; exactly one PCU of each seat column is a column master PCU, coupled to all row master PCUs in the column; exactly one PCU of each seat zone is a zone master PCU, coupled to all column master PCUs in the zone; and exactly one zone master PCU is a PCU system master, coupled to all zone master PCUs, the PCU system master providing a single connection of the peer-to-peer network to a network of overhead devices.

In accordance with yet another embodiment thereof, the disclosure provides a passenger control unit (PCU), configured for association with a passenger seat of an aircraft. The PCU includes a processor and system memory, the processor being programmed for differential peer-to-peer communication with adjacently interconnected PCUs throughout a hierarchical data network and with an external system of the aircraft, and a passenger operable control for the external system. The PCU also includes a standard data and power interface, couplable to a direct current (DC) power source, having a plurality of two-wire data interfaces for receiving and transmitting data with the adjacently interconnected PCUs, whereby any PCU is interchangeable with any other PCU within the hierarchical data network, and functions depending upon its position in the hierarchical data network.

BRIEF DESCRIPTION OF THE DRAWINGS

FIG. 7 is a partial schematic plan view diagram of an embodiment of a DC-based peer network in accordance with the present disclosure.

FIG. 8 is a side view of a column of seats, showing the connection of PCU's in each seat in the column.

FIG. 9 is a front view showing the seat-to-seat connections in multiple seat row groups.

Figure 1:
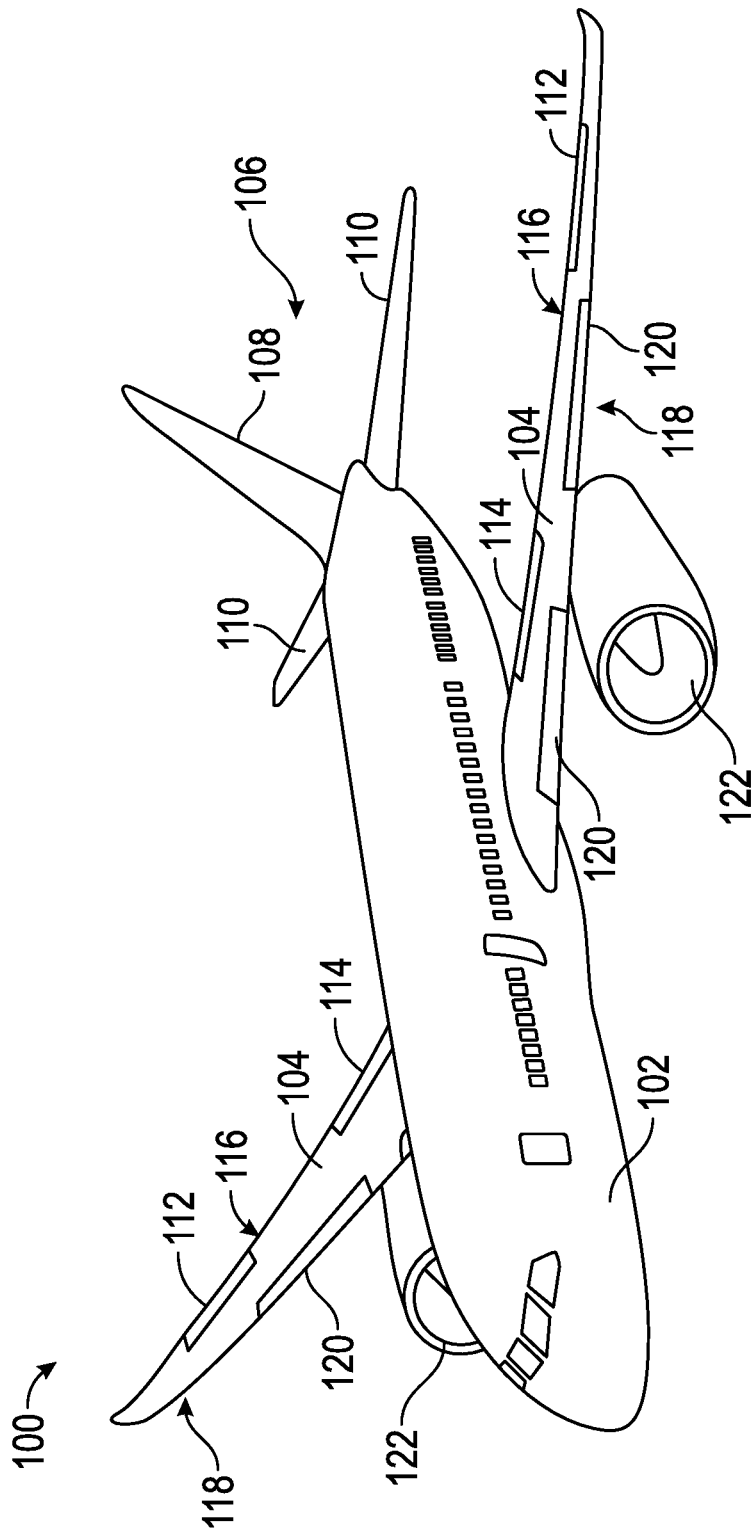
FIG. 1 is a perspective view of an aircraft.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

As noted above, the present disclosure relates to the Passenger Services System and seat-to-seat electronics systems for commercial aircraft. Referring to FIG. 1, a conventional commercial aircraft 100 typically includes a fuselage 102, a main wing 104 attached to the fuselage 102, and a tail structure 106 that includes a vertical stabilizer 108 and a horizontal stabilizer 110. The main wing can include ailerons 112 and wing flaps 114 along its trailing edge 116 for assisting with low speed flight, and the leading edge 118 of the wing 104 can include moveable slats 120 for increasing lift during takeoff. The aircraft 100 also includes engines 122, in this case mounted to the main wings 104, for providing thrust for flight.

On modern commercial aircraft, the Passenger Services System can include a Cabin Services System, In-Flight Entertainment System, seat-to-seat communication and USB charging for personal electronic devices at each passenger seat. These overlapping systems traditionally involve data aggregating and power conditioning equipment, along with a passenger control unit at each seat. These components typically involve a significant quantity of hardware and wiring, which tend to add weight, cost and complexity to the aircraft.

Figure 2:
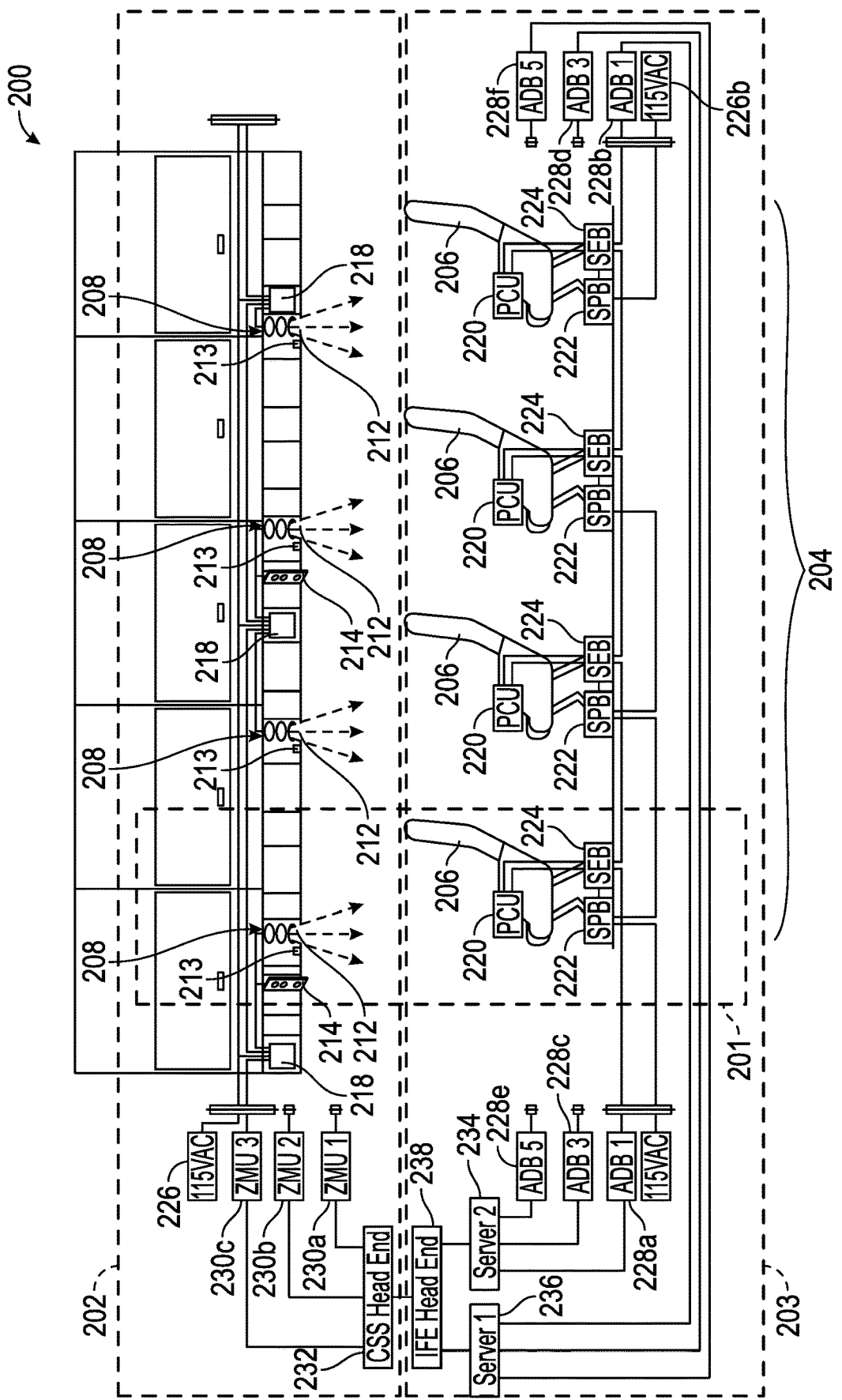
FIG. 2 is a partial side-schematic view of a portion of an aircraft cabin, showing a schematic diagram of one embodiment of a prior art passenger data network (CSS and IFES).

Advantageously, as disclosed herein, a DC-based peer network has been developed that provides these functions with a significant reduction in hardware and wiring. To appreciate the features provided by the system disclosed herein, it is helpful to first observe prior aircraft Passenger Services Systems and their components. Shown in FIG. 2 is a partial side-schematic view of a portion of an aircraft cabin 200, showing a schematic diagram of one embodiment of a prior art passenger data network for a Passenger Services System (PSS) 201 having individual portions associated with each passenger seat 206, only one of which is outlined in dashed lines in FIG. 2. The PSS 201 is an overlapping system of systems, in that each portion of the PSS 201 includes a single seat or row portion of the cabin services system (CSS) 202 and of the in-flight entertainment system (IFES) 203, in a particular group or zone 204 of seats 206. While individual seats 206 are shown in this side view, each seat 206 in this view represents a row of immediately adjacent seats 206 in the zone 204. It is also to be appreciated that while the dashed outline of the PSS 201 in FIG. 2 is shown only in relation to a single seat 206, it is to be understood that this one instance is intended to be representative of how the PSS 201 is associated with each row and overlaps with the CSS 202 and IFES 203. In the configuration shown in FIG. 2, an overhead Passenger Services Unit (PSU) panel 208 is provided above each row of seats 206 and includes various components of the PSS, including Reading Lights 212, attendant Call lights 213, and signage 214, such as FASTEN SEAT BELTS and NO SMOKING signs. The CSS 202 also includes Overhead Electronics Units (OEUs) 218, Zone Management Units (ZMUs) 230, and a CSS Head End Unit 232. The Reading lights 212, Call Lights 213, and signage 214 can be referred to generally as overhead PSS devices. Additional overhead devices, such as passenger air nozzles (not shown) can also be incorporated into an overhead panel, but are not shown in the drawings because they are not considered to be part of the PSU or of the CSS 202. Power and electronic data for the overhead PSS devices of each overhead PSU panel 208 or for those of a group of overhead PSU panels 208 can be provided through the overhead electronics unit (OEU) 218. These types of overhead electronics units will be well known to those of skill in the art.

The IFES 203 is associated with each individual seat 206. For example, each passenger seat 206 can include a passenger control unit (PCU) 220, typically disposed in the armrest of the seat 206, which receives power from a seat power box (SPB) 222 and data from a seat electronics box (SEB) 224. These components of the IFES 203 allow a variety of convenient services for each passenger, including Internet connectivity, seat-to-seat communication and USB charging for personal electronic devices. For seats 206 in wide body aircraft, where the overhead PSU panel 208 is generally out of reach of a seated passenger, each PCU 220 can also include controls for the overhead PSS devices.

Power to each OEU 218 is provided from via 115 v AC power line that is interconnected with the aircraft power system 226. Similarly, power to the SPB 222 and SEB 224 for each passenger seat 206 (and ultimately for its associated PCU 220) is also provided by the 115 v AC aircraft power system 226. The power system shown in FIG. 2 for the PCUs 220 includes a forward power connection point 226a and an aft power connection point 226b for the seat zone 204.

Electronic data for all of the PCUs 220 in the zone 204 is provided through both fore and aft area distribution boxes (ADB), indicated generally at 228. In the view of FIG. 2, three ADBs 228 are shown at each end of the system, though only ADB1 228a and ADB2 228b are connected to the SEBs 224 of the seats 206 in this seat zone 204. Having fore and aft ADBs 228 allows a redundant connection. Each pair of ADBs 228 represents those associated with each of three seat row portions of a wide body aircraft—i.e. right, left and center rows of seats 206, relative to the dual aisles of a wide body aircraft. The diagram of FIG. 2 thus represents a seat zone 204 (e.g. First Class) of the right, center, or left side of the aircraft, while the other four ADBs 228 at each end (ADB3 228c, ADB5 228e, ADB4 228d, and ADB6 228f) represent the area distribution boxes 228 for subsequent zones on the aircraft (e.g. Business Class and Economy Class).

Electronic data for all of the OEUs 218 in the zone 204 is provided through a zone management unit (ZMU), indicated generally at 230. Similar to the arrangement of the ADBs 228, ZMU3 230c is connected to the OEUs 218 in this seat zone 204 (e.g. First Class), which represents a seat zone, while the other two ZMUs (ZMU2 230b, ZMU1 230a) represent the zone management units for the subsequent zones (e.g. Business Class and Economy Class).

The ZMUs 230 are coupled to and controlled by a CSS head end unit 232, which provides data and control for all of the OEUs 218 through their respective ZMUs 230. The fore and aft ADB units 228a, 228b are similarly coupled to server 2 234 and server 1 236, respectively. These two data servers are coupled to the In-Flight Entertainment (IFE) head end unit 238, which manages content and distribution of entertainment and other data to the PCUs 220 of each seat. The IFE head end unit 238 is also connected to the CSS head end unit 232 so that control inputs for overhead PSS devices can be routed from individual seat PCUs 220 to the components of the associated overhead PSU panels 208 in wide body aircraft.

Figure 3:
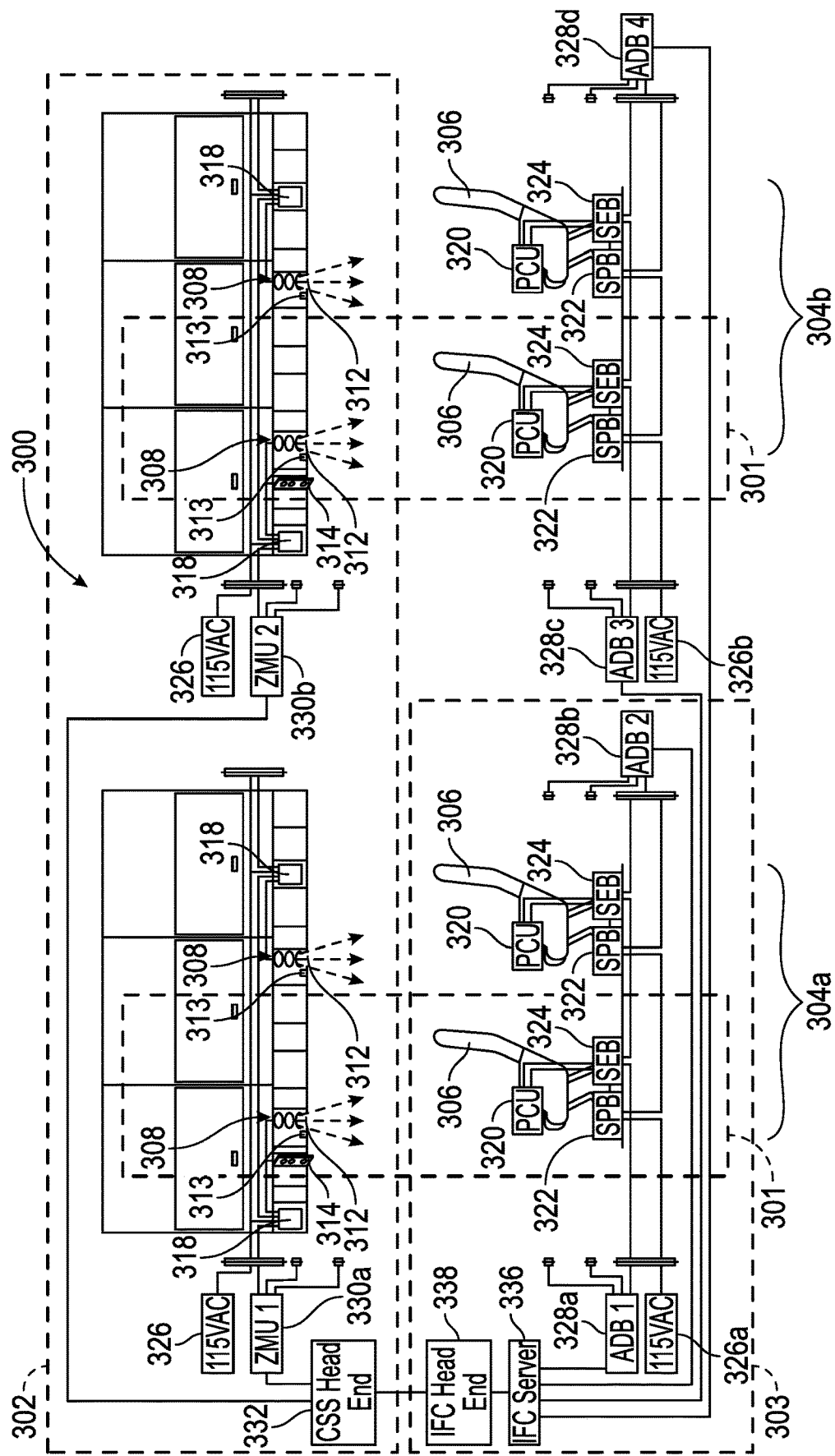
FIG. 3 is a partial side-schematic view of a portion of an aircraft cabin, showing a schematic diagram of another embodiment of a prior art passenger data network (CSS and IFES) for an aircraft cabin having multiple seating zones.

Shown in FIG. 3 is a partial side-schematic view of an aircraft cabin 300 having another embodiment of a prior art Passenger Services System 301 (outlined in dashed lines) implemented with a CSS 302 and IFES 303. As in FIG. 2, while the dashed outline of the PSS 301 in FIG. 3 is shown only in relation to a single seat 206 in each of the forward zone 304a and aft zone 304b, it is to be understood that this one instance in each zone is intended to be representative of how the PSS 301 is associated with each row and overlaps with the CSS 302 and IFES 303. This diagram shows the wiring arrangement for a CSS 302 controlling two different seating zones 304 (e.g. a forward zone 304a and an aft zone 304b) of an aircraft having an In-Flight Entertainment System 303 and a slightly different overall configuration. As with the system shown in FIG. 2, the cabin 300 includes an overhead Passenger Services Unit (PSU) panel 308 for each seat, which includes overhead components of the PSS 301, including Reading lights 312, Call Lights 313, signage 314, etc. (collectively referred to as overhead PSS devices). Power and electronic data for the overhead PSS devices of each overhead PSU panel 308 or for a group of overhead PSU panels 308 can be provided through an overhead electronics unit (OEU) 318.

Each passenger seat 306 includes a passenger control unit (PCU) 320, which receives power from a seat power box (SPB) 322 and data from a seat electronics box (SEB) 324, facilitating seat-to-seat communication and USB charging for personal electronic devices at each seat. Each PCU 320 also includes controls for the overhead PSS devices.

As with the embodiment of FIG. 2, power to each OEU 318 is provided via the 115 v AC power from the aircraft power system 326. Similarly, power to the SPB 322 and SEB 324 for each passenger seat 306 (and ultimately for the associated PCU 320) is also provided by the 115 v AC aircraft power system 326. The power system shown in FIG. 3 depicts only a forward power connection point 326a for the forward seat zone 304a, and a forward power connection point 326b for the aft seat zone 304b. It is also possible to have an aft power connection, if desired.

Electronic data for all of the PCUs 320 in the forward zone 304a is provided through redundant fore and aft area distribution boxes ADB1 328a and ADB2 328b. Electronic data for all of the PCUs 320 in the aft zone 304b is provided through redundant fore and aft area distribution boxes ADB3 328c and ADB4 328d. In the system of FIG. 3, rather than separate ADBs 328 for the right, left and center seat sections, only one ADB 328 is shown at each end of each zone 304, and is associated with all three seat row portions of the wide body aircraft—i.e. right, left and center rows—in its zone 304. Similarly, electronic data and control for all of the OEUs 318 in each zone 304 is provided through a single ZMU 330, which is also associated with all three seat row portions of the wide body aircraft. Thus, ZMU1 330a provides control to all of the OEUs 318 in the fore zone 304a, and ZMU2 330b provides control to all of the OEUs 318 in the aft zone 304b.

As with the configuration of FIG. 2, in FIG. 3 the ZMUs 330 are coupled to and controlled by a CSS head end unit 332, which provides data and control for all of the OEUs 318 through their respective ZMUs 330. Unlike the configuration of FIG. 2, the fore and aft ADB units 328a, b are all coupled to one or more IFE servers 336, which in turn are connected to an IFE head end unit 338, which manages content and distribution of entertainment and other data to the PCUs 320 units of each seat 306. The IFE head end unit 338 is connected to the CSS head end server 332 so that control inputs for overhead PSS devices can be routed from individual seat PCUs 320 to the components of the associated overhead PSU panel 308.

As will be apparent from the systems shown in FIGS. 2 and 3, the mechanical, electrical, and other components that are involved in these Passenger Services Systems are significant in size, weight, volume and complexity. In a given aircraft they can involve considerable lengths of electrical wiring and cable in the ceiling or crown and through the floor of the aircraft, along with data aggregating and power conditioning equipment at each seat. The additional hardware for these types of systems tends to add weight, cost and complexity to the aircraft.

Advantageously, as disclosed herein, a DC-based peer network has been developed that provides comparable functionality, but with a significant reduction in hardware and wiring. The system disclosed herein uses DC power and two-conductor differential communication hardware to implement a lightweight network between seat groups, columns, and zones in an aircraft. Component count is reduced by routing power and data directly to passenger control units at each seat without intermediate controllers to condition power and aggregate data. The network can be implemented within seats, within overhead electronics, or as a combination of the two, while interfacing with other Cabin Management Systems as desired.

Figure 4:
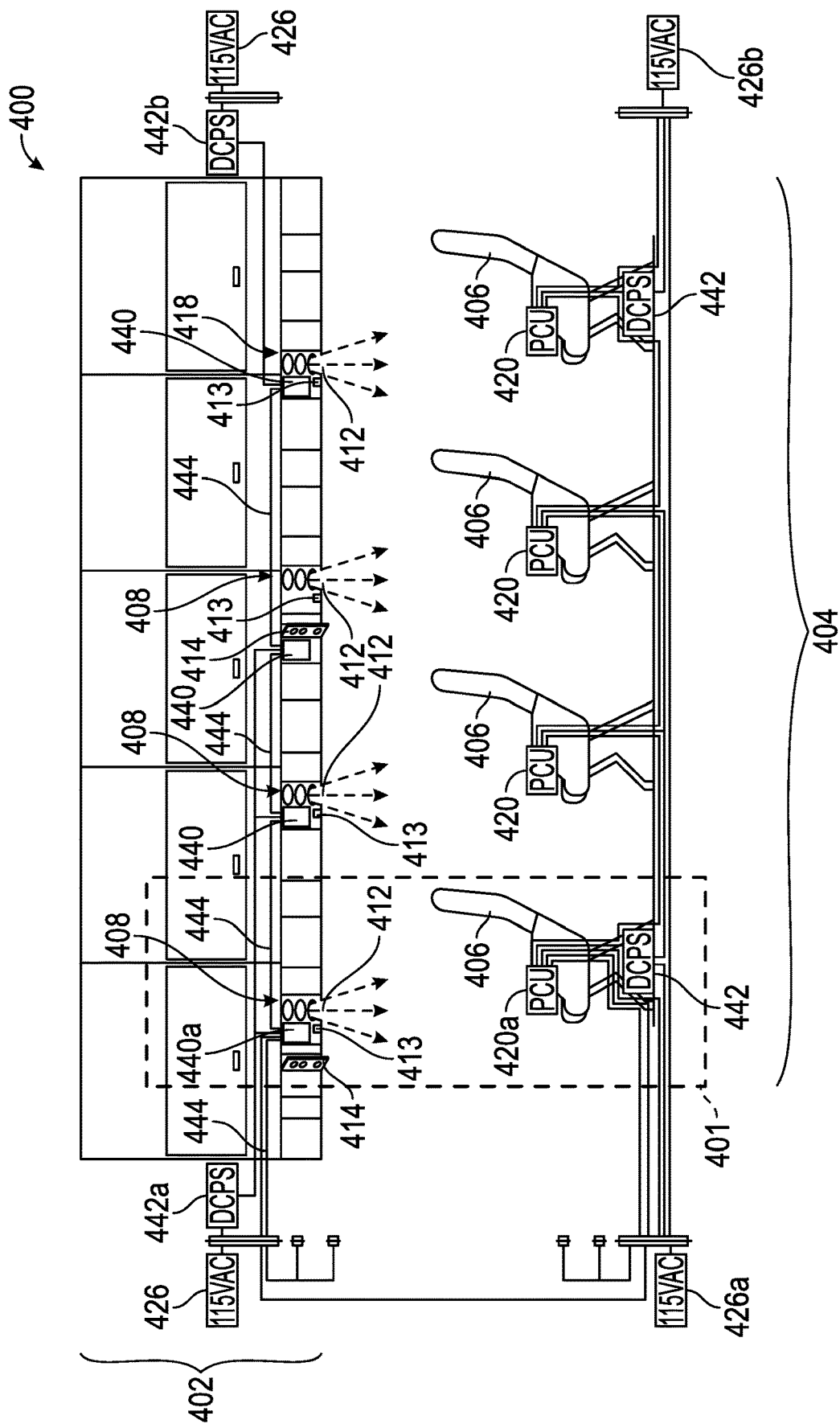
FIG. 4 is a partial side-schematic view of a portion of an aircraft cabin, showing a schematic diagram of one embodiment of a DC-based peer network in accordance with the present disclosure.

Shown in FIG. 4 is a partial side-schematic view of a portion of an aircraft cabin 400, showing a schematic diagram of one embodiment of a DC-based peer network in accordance with the present disclosure. This figure shows a Passenger Services System (PSS) 401 associated with one group or zone 404 of seats 406, each individual seat 406 in this view representing a row of immediately adjacent seats 406 in the zone 404. The configuration shown in FIG. 4 does not include an In-Flight Entertainment System, but does include USB power and connection components, as described in more detail below. As with the systems shown in FIGS. 2 and 3, in the configuration shown in FIG. 4 each seat row includes an overhead PSU panel 408 that includes overhead PSS devices that are part of the PSS 401, including Reading lights 412 and Call Lights 413, etc. While it was noted above that overhead PSS devices in prior system are considered part of the CSS, the embodiment of FIG. 4 does not include a CSS system. Instead, the overhead PSS devices are part of what can be referred to as an overhead PSS system 402, which is also part of the PSS 401 for each seat 406 or row. As in FIGS. 2 and 3, while the dashed outline of the PSS 401 in FIG. 4 is shown only in relation to a single seat 406, it is to be understood that this one instance is intended to be representative of how the PSS 401 is associated with each row and overlaps with the overhead PSS system 402.

Each passenger seat 406 includes a passenger control unit (PCU) 420, typically disposed in the armrest of the seat. The PCU 420 can allow USB charging for personal electronic devices and includes controls for the overhead Reading Light and Call Light.

Unlike the prior systems, power and data for the overhead PSU panels 408 and PCUs 420 are provided differently in this system. Rather than an OEU for each overhead PSU panel 408 or group of overhead PSU panels 408, each overhead PSU panel 408 includes a Micro Controller Unit (MCU) 440 that includes a discrete microcontroller having a processor and system memory. The microcontroller can be any one of a wide variety of commercially available embedded controllers, such as a Freescale KW20 or Microchip PIC32. Power for all MCUs 440 is provided from a DC power Supply (DCPS) 442 that is connected to the 115V AC aircraft power supply 426, thus providing DC power to all of the MCUs 440 and the overhead components associated with each overhead PSU panel 408. While a single DCPS 442 can provide power to all MCUs 440 in a given zone 404, fore and aft DCPS units 442a, b can be provided in a given zone 404 to provide power to both forward and aft sections of a column, in the manner discussed above. In this same way it is possible to use multiple DCPS units to segment a long column into different regions.

All of the MCUs 440 in a given zone 404 have data connection cables 444 that are coupled in a hierarchical daisy-chain fashion with adjacent MCU units 440 in the seat zone 404. This allows unique data and commands to be sent from MCU to MCU until they reach any destination MCU 440 in the zone 404.

The MCUs 440 can be structurally and functionally identical devices that each provide a commanded function depending upon their location in the hierarchical connection network, thus creating a peer-to-peer network among the MCUs 440. A hierarchical data transfer logic program can be stored in memory in each MCU 440, and each individual MCU 440 will have its specific identity and hierarchical position in the network stored in memory. When a signal is received by any given MCU 440, the signal can include a data string that indicates the destination for that signal. If the given MCU 440 is not the destination MCU 440, but is upstream of the destination MCU 440 or other destination device in the hierarchy (depending on the direction of the signal), it will pass the signal on to the next MCU 440 or other next device in the chain. For example, while no CSS head end device is shown in FIG. 4, such a device can be included in this configuration, if desired, and coupled to the MCU system master 440a. Otherwise, all commands and signals between the master PCU 420a and the MCU system master 440a can go directly between these two devices. If a given MCU 440 is not the destination MCU 440 and is not upstream of the destination MCU 440 or other destination device in the system hierarchy (depending on the direction of the signal), it will ignore the signal, based on the data transfer programming logic. In this way, a differential peer-to-peer network is created in which any MCU can communicate with any PCU 420 or MCU 440 throughout the network, and also with an external system of the aircraft. Consequently, the MCUs are structurally identical and interchangeable. Each MCU forwards data along the network depending upon its position in the hierarchical network. In another embodiment, each of the MCUs can be on a multi-drop data bus so that each will respond to addressed messages.

Similar to the arrangement of the MCUs 440, power for all PCUs 420 is provided from fore and aft DC power supply (DCPS) units 442 that are connected to the 115 v AC aircraft power supply 426, thus providing DC power to all of the PCUs 420. Advantageously, a single DCPS 442 can provide power to all PCUs 420 in a given zone 404. Alternatively, as shown in FIG. 4, fore and aft DCPS units 442a, b can be provided in a given zone 404, in the manner discussed above. In this same way it is possible to use multiple DCPS units to segment a long column into different regions. Any number of DCPS units 442 can be used in a given zone 404.

Like the MCUs 440, the PCUs 420 are also interconnected in a hierarchical peer-to-peer network. The PCUs 420 can be identical devices, such as the PCU 420/520 shown in FIG. 6, having a microprocessor 602 and system memory 604, the memory 604 being provided with programming for the functions of the PCU 420 and for the hierarchical data transfer logic. Each PCU 420 is configured to provide a standard interface for all external systems (e.g. ARINC 628 Part B for interfacing to the CSS), though only some PCUs 420 will be connected directly to the external systems, as discussed below. Each seat 406 has a PCU 420, and each PCU 420 is configured to control the data, communications and other functions for its associated seat 406. In addition, one PCU 420c at the end of each row of seats 406 can be designated as a row master; one PCU 420b at the head of a column of seats 406 can be designated as a column master; and one PCU 420a at the head column and/or head row of a zone 404 can be designated as a zone master PCU 420a. A zone master PCU 420a will generally also be a column master PCU 420b, hence the PCU 420 at the far left of FIG. 4 is designated 420a/b.

The zone master PCUs 420a for each of multiple zones 404 on an aircraft are communicatively coupled to each other, and will interface with all external systems for data handling. In the system of FIG. 4 there are no seat power boxes (SPBs) and seat electronics boxes (SEBs) for each seat 406, thus greatly reducing weight and complexity. Additionally, a single inter-system data connection line 446 extends from the zone master PCU 420a up to the MCU system master 440a of the overhead PSU panels 408, allowing any passenger in any seat 406 in the zone 404 to control their corresponding overhead PSU panel 408 using the PCU 420 of their particular seat. Data and commands from all PCUs 420 in a given zone 404 can thus be routed through a common inter-system data communication line 446 to all MCUs 440, thus greatly reducing wiring.

Figure 5:
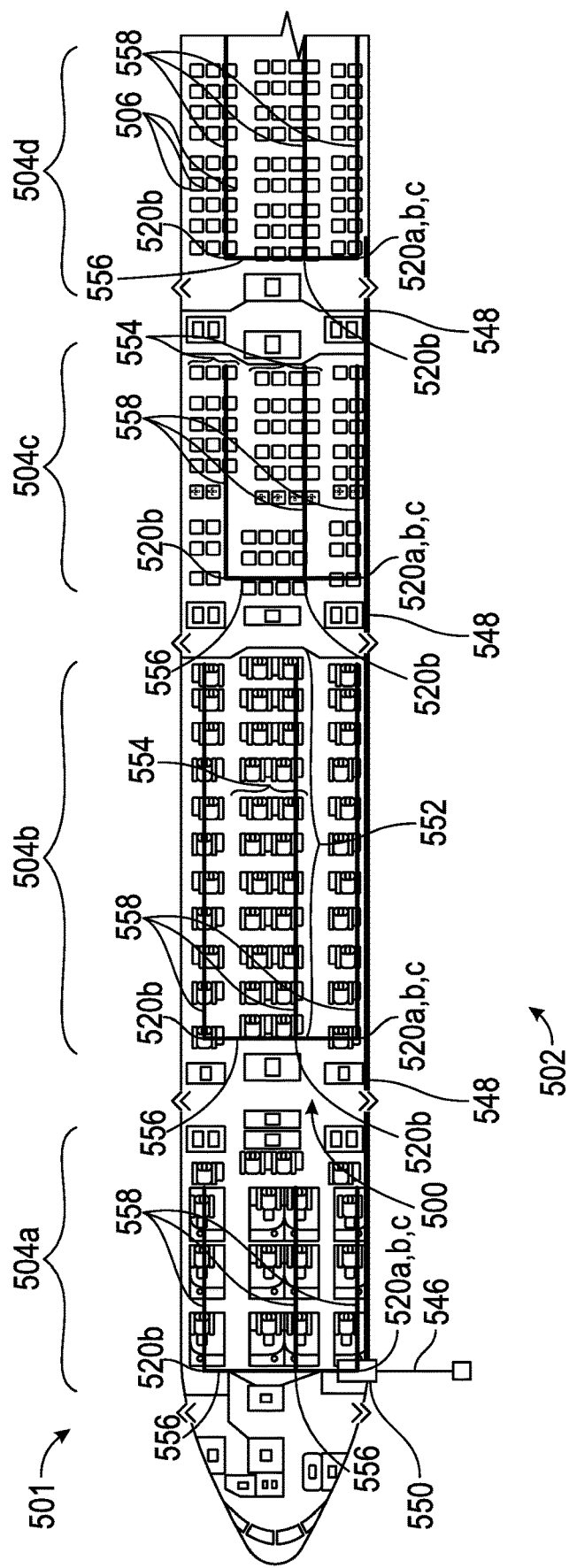
FIG. 5 is a partial plan view of an aircraft fuselage, showing a schematic plan view diagram of an embodiment of a DC-based peer network in accordance with the present disclosure.

Shown in FIG. 5 is a partial plan view diagram of a cabin 500 of an aircraft 501 having an embodiment of a DC-based peer network 502 in accordance with the present disclosure. This diagram helps to illustrate the hierarchical peer-to-peer system.

The aircraft cabin 500 is divided into four general sections, a first-class section 504a, a business-class section 504b, and two economy class sections 504c, 504d. Each of these sections can be designated as an individual zone 504 for purposes of the peer-to-peer system 502. Each zone 504 includes a zone master PCU 520a, which will be the PCU 520 associated with one particular seat in the respective zone 504. The PCU system Master 550 is a PCU 520 that includes an inter-system data connection line 546 to route messages to an external system such as the overhead PSS system (402 in FIG. 4) or a corresponding MCU system Master (440a in FIG. 4). The zone master PCUs 520a are all interconnected via the zone master communications line 548 to the PCU System Master 550. Each zone master PCU 520a is, in turn, connected to each column master PCU 520b that is at the head of a column 552 of rows 554 of seats 506 by the column master communication line 556. As noted above, in this cabin configuration each zone master PCU 520a is also a column master PCU 520b and a row or group master PCU 520c, hence the PCU 520 at the lower left corner of each zone in FIG. 5 is designated 520a/b/c. Each column master PCU 520b is connected to each row master PCU 520c in the column 552 via row master communication lines 558, and, finally, each row master PCU 520c is connected in series to each PCU 520 in its respective row 554. In this way, each PCU 520 serves its given seat, and can serve as any one or more of a row master, column master or zone master PCU, depending upon its location within the hierarchical peer-to-peer system 502.

Figure 6:
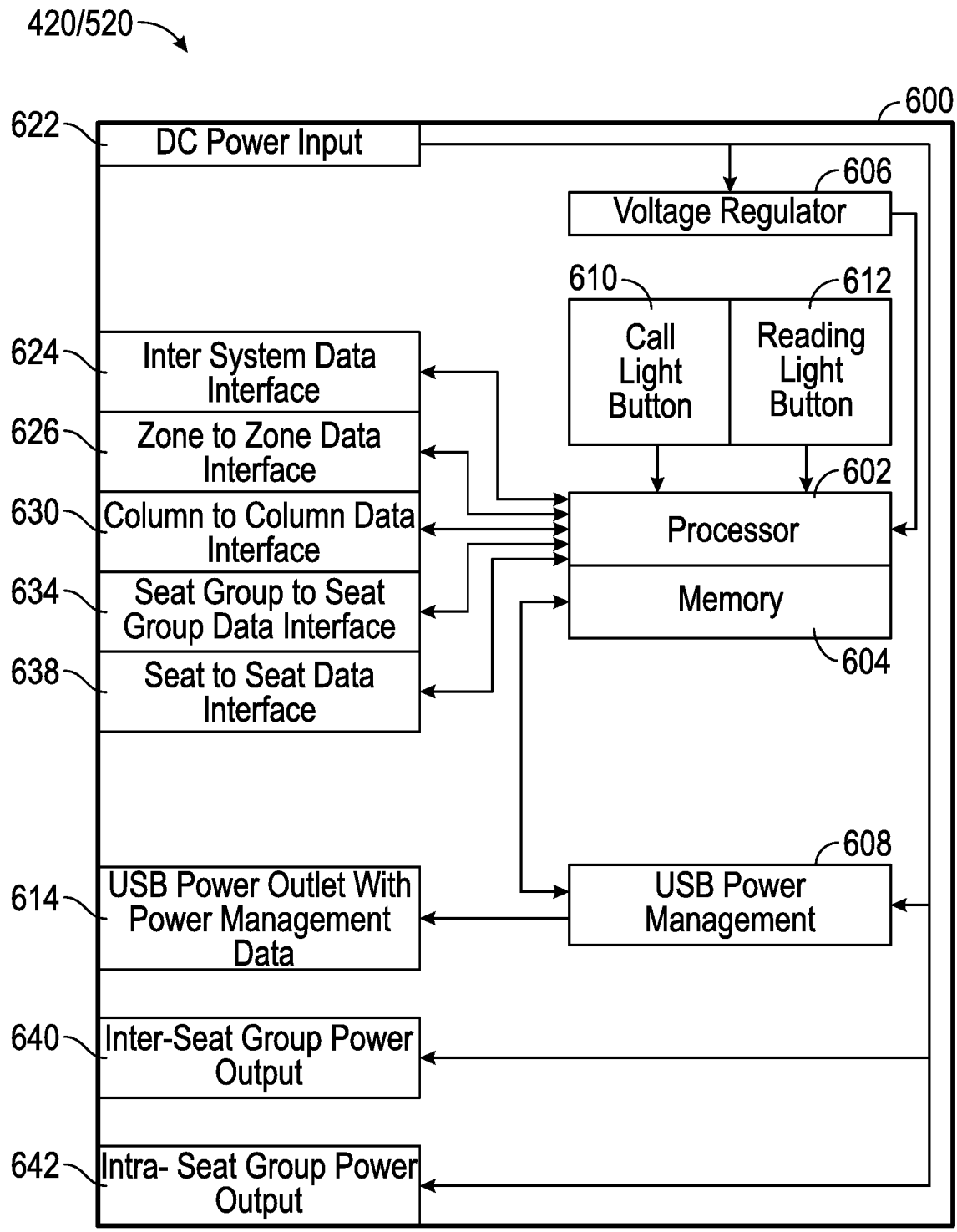
FIG. 6 is a block diagram of an embodiment of a passenger control unit that can be used in a DC-based peer network in accordance with the present disclosure.

As noted above, the PCU devices 520 can be structurally identical units that can each perform all of the various data handling and other functions desired at any position in the hierarchical peer-to-peer network system 502. Shown in FIG. 6 is a block diagram of one embodiment of a PCU 420/520 that can provide these functions. The PCU 420/520 generally includes a housing 600 containing a microprocessor 602 and memory 604, which together store and carry out programmed instructions for the device. The processor is programmed for differential peer-to-peer communication with any adjacently interconnected PCU throughout the network, and also with an external system of the aircraft. Because of this programming, any PCU is interchangeable with any other PCU within the network, and functions depending upon its position in the hierarchical network. A voltage regulator 606 or other power conditioning device can be included to compensate for possible voltage spikes or other power fluctuations that could affect the power supply to the processor and other components of the PCU 420/520. The processor 602 is also connected to a USB management circuit 608, described in more detail below, and to an attendant call light button 610 and reading light button 612 that are provided for the convenience of the passenger. The PCU 420/520 also includes a USB connector 614, which is coupled to the USB management circuit 608, and allows a passenger to obtain power and data for a personal USB device, such as a smart phone, tablet computer, etc. The USB connector 614 and attendant call light and reading light buttons 610, 612 can be collectively referred to as passenger input/output devices.

As noted above, the entire PCU 420/520 can be included in an armrest of an aircraft passenger seat (406, 506 in FIGS. 4, 5), making the passenger input/output devices easily accessible. Alternatively, the passenger input/output devices can be disposed within the armrest, while physically separated from the housing 600 of the PCU device 420/520 as a whole, and connected with suitable wiring. This option could be desirable, for example, where geometric constraints of the armrest or other parts of the passenger seat (406, 506 in FIGS. 4, 5) make it desirable to physically separate the passenger input/output devices from the rest of the PCU device 420/520.

The PCU 420/520 includes a series of connectors, that allow the PCU 420/520 to be selectively connected to one or more other PCUs 420/520 and operate at any position within the hierarchical peer-to-peer network. It is to be appreciated that the position and order of the connectors shown in FIG. 6 is exemplary only. The various connectors can be placed in any desired order and in a variety of different positions upon the housing 600 of the PCU 420/520, and can be configured for use with a variety of types of connectors that are used for electronic devices. The first connector is a DC power supply input interface 622, which connects directly to the voltage regulator 606 for providing DC power to the PCU 420/520. Depending upon the particular position of the PCU 420/520 within the peer-to-peer network system, the DC power supply input interface 622 can connect directly to one of the DCPS units (442 in FIG. 4), or it can be connected to one of the power output connections of an upstream PCU 420/520, as described in more detail below. Generally speaking, zone master PCUs 420a/520a will be connected directly to a DCPS unit, as will row master PCUs 420c/520c and/or column master PCU's 420b/520b. This arrangement is clearly shown in FIG. 7. Other PCUs 420/520 in any given zone 404/504 or row 554 can receive power through connection to an upstream PCU 420/520, as described in more detail below. At the same time, it is to be appreciated that because all PCUs 420/520 have the same configuration, any PCU 420/520 at any position in the system can be directly connected to a DCPS unit (442 in FIG. 4), if desired.

Referring again to FIG. 6, the next connector on the PCU 420/520 is an inter system data interface 624, which connects to the PCU processor 602. This connector is only used for PCU System master PCUs 550, and connects the System Master PCU 550 to the inter-system data communications line (546 in FIG. 5) that connects to any external device such as the CSS Head End as shown and discussed above with respect to FIG. 5, and as also shown in FIG. 7. This inter system data interface 624 is a data-only interface. It does not transmit power.

The next connector on the PCU 420/520 is a zone-to-zone data interface 626, which is another data-only connector coupled to the PCU processor 602, and is only used for zone master PCUs 420a/520a. This connector connects the PCU 420/520 to the zone master communications line 548 that connects all the Zone Master PCUs 420a/520a, as shown and discussed above with respect to FIG. 5, and as also shown in FIG. 7. This connector allows zone data for all PCUs 420/520 to be received by the processor 602 of the zone master PCU 420a/520a. The processor 602 of the zone master PCU 420a/520a is programmed to determine which data signals are directed to PCUs 420/520 in its respective zone (or to itself), and to ignore the rest. Signals that are directed to that particular PCU 420/520 are acted upon. Signals that are directed to any other PCU 420/520 in the relevant zone are then routed in the appropriate direction, in the manner described below. This data handling protocol provides a true peer-to-peer differential communication network in which any PCU can communicate with any adjacently interconnected PCU throughout the network, and also with an external system of the aircraft. Each PCU forwards data along the network depending upon its position in the hierarchical network. In another embodiment, the Zone Master PCUs 420a/520a can be on a multi-drop network and configured to respond to addressed messages.

The next interface on the PCU 420/520 is a column-to-column data interface 630, which is configured for connecting to the column master communication line 556 for communication between Column Master PCUs 420b/520b. The column-to-column data interface 630 allows data sent via the zone-to-zone data interface 626 of an upstream zone master PCU 420a/520a to be received and transmitted to the processor 602 of the respective column master PCU 420b/520b. The column-to-column data interface 630 routes messages between Column Master PCUs 420b/520b to be processed by the respective Column (552 in FIG. 5) within which the respective PCU resides.

Provided in FIG. 7 is a closer partial schematic plan view diagram of one zone 504 and parts of an adjacent zone in a DC-based peer network 502 in accordance with the present disclosure. A side view of a column 552 of seats 506, comprising multiple rows of seats 506 one behind another, is provided in FIG. 8. In this view, the row or group master PCU's 520c in each seat group in the column 552 are shown connected to the column master PCU 520b via the row master communication lines 558. The row master communications lines 558 can be coupled to the individual row master PCUs 520c in a daisy-chain fashion via a connector 562 that is installed on each passenger seat 506. Provided in FIG. 9 is a front view of a row 554 of seats 506 and part of an adjacent row, showing a column/row master PCU 520b/c and its connection to another column/row master PCU 520b/c via the column master communication line 556, along with individual seat PCUs 520 connected by seat-to-seat communication lines 557.

Referring to FIGS. 6-9 together, the processor 602 of the column master PCU 420b/520b is programmed to determine which data signals received via the column-to-column data interface 630 are directed to PCUs 420/520 in its respective column 552 (or to itself), and to ignore the rest. Signals that are directed to that particular PCU 420/520 are acted upon. Signals that are directed to any other PCU 420/520 in the relevant column 552 or the row 554 of the column master PCU 520b are then routed via the seat group-to-seat group data interface 634 (which couples to a row master communications line 558), or the seat-to-seat data interface 638 (which couples to a seat-to-seat communications line 557), as further described below. This data handling protocol provides a true peer-to-peer differential communication network in which any PCU can communicate with any adjacently interconnected PCU throughout the network, and also with an external system of the aircraft. Each PCU forwards data along the network depending upon its position in the hierarchical network. In another embodiment the columns can be on a multidrop bus and can respond to messages without forwarding.

Referring again to FIG. 6, the next interface on the PCU 420/520 is a seat group-to-seat group data interface 634. This connector can be configured to provide data from one Seat Group Master PCU 420c/520c to any contiguous Seat Group Master PCU 420c/520c of a given Column via the row master communications line 558. The seat group-to-seat group data interface 634 is coupled to the processor 602 of the PCU 420/520 and receives data from any adjacently connected PCU, and routes this data to the processor 602. The processor 602 of the seat group master PCU 420c/520c is programmed to determine which data signals are directed to PCUs 420/520 in its respective group or row 554 (or to itself), and to ignore the rest. Signals that are directed to that particular PCU 420/520 are acted upon. Signals that are directed to any downstream or upstream PCU 420/520 in the relevant seat group or row 554 or column 552 are then routed via the appropriate data interface (634 or 638) into either the row master communications line 558 or the seat-to-seat communications line 557. This data handling protocol provides a true peer-to-peer differential communication network in which any PCU can communicate with any adjacently interconnected PCU throughout the network, and also with an external system of the aircraft. Each PCU forwards data along the network depending upon its position in the hierarchical network.

The next interface on the PCU 420/520 is a seat-to-seat data interface 638. The seat-to-seat data interface 638 provides data from the PCU 420/520 of one seat 506 to the PCU 420/520 of the next adjacent seat 506 in a group or row 554 of seats 506 via the seat-to-seat communications line 557. These seat-to-seat data interfaces 638 are coupled to the processor 602 of the PCU 420/520, and receive data from the next adjacently connected PCU 420/520, and route the data to the processor 602. Again, the processor 602 of each PCU 420/520 is programmed to determine which data signals are directed to itself or to PCUs 420/520 upstream or downstream in its respective zone 504, column 552, or group or row 554, and to ignore the rest. Signals that are directed to that particular PCU 420/520 are acted upon. Signals that are directed to any upstream or downstream PCU 420/520 in the relevant seat zone 504, column 552 or group or row 554 are then routed in the proper direction via the appropriate data interface, as discussed above. The seat-to-seat data interface 638 is thus used to connect adjacent PCUs 420/520 in each seat group 554 via the seat-to-seat communications line 557 in a daisy-chain fashion, until reaching the final seat 506 in a seat group 554. This data handling protocol provides a true peer-to-peer differential communication network in which any PCU can communicate with any adjacently interconnected PCU throughout the network, and also with an external system of the aircraft. Each PCU forwards data along the network depending upon its position in the hierarchical network.

Each PCU 420/520 also includes an inter-seat group power output 640 and an intra-seat group power output 642. These connectors are coupled to the DC power input, and allow transmission of electrical power throughout the network of connected PCUs 420/520. Specifically, as noted above, each PCU receives power input at the DC power input interface 622. This DC power input can be from a DCPS 442/542, or from another adjacent PCU, via either the inter-seat group power output 640 or intra-seat group power output 642. The inter-seat group power output 640 sends power from one seat group 554 to the next (i.e. interconnects seat group master PCUs 520c). The intra-seat group power output 642 sends power from one seat 506 to the next (i.e. interconnects PCUs in a given row 554 downstream of the seat group master PCU 520c). Advantageously, this power transmission can be carried by a conductor or group of conductors in either the row master communications line 558 or the seat-to-seat communications line 557, as applicable, thus employing only one connection wire for each PCU 520 in many parts of the peer-to-peer network 502. Different connectors for the inter- and intra-seat group power outputs 640, 642 can be provided because the PCUs 520 in any given seat row will cumulatively demand less power than will be needed to supply multiple rows, and hence connecting cables (e.g. 557, 558) of different size and current carrying capacity can be used in these two different applications.

In practice, all power and data connection points or pins for each PCU 420/520 can be physically adjacent to each other in one group, which simplifies the system so that each PCU 420/520 can, depending on its position in the network, be connected to just one combined input cable, providing both power and data, and just one combined output cable, providing both power and data. An additional connection cable to a DCPS (442 in FIG. 4) can be provided for all PCUs 420/520 that have a direct power connection, rather than receiving power output from an upstream PCU 520. It is also to be understood that zone master, column master and row master PCUs, 520a, b, c, respectively, will typically have multiple data connections.

Connection points made for the data wire within a given interconnection cable can differ (i.e. physically connect with a different data interface) depending upon the position and type of connection. Differentiation between different connection types can be facilitated in various ways, such as by connector keying. Thus, for example, all column master connection cables 556 that interconnect zone master PCUs 420a/520a to column master PCUs 420b/520b can have a first connector key configuration; all group master connection lines 558 that interconnect column master PCUs 420b/520b to group master PCUs 420c/520c can have a second connector key configuration; and all seat-to-seat connection lines 557 that interconnect PCUs 420/520 seat-to-seat can have a third connector key configuration.

The simplified peer-to-peer system shown in FIGS. 4-9 can be used with either or both of the PCU 420 and MCU 440 portions of the system. While the diagram of FIG. 5 shows the hierarchical zone arrangement for the peer-to-peer system associated with the PCU units 520, it is to be understood that a similar arrangement can be used for interconnection of the overhead MCU units (440 in FIG. 4) in an analogous peer-to-peer network. Thus, the diagram of FIG. 5 represents both the peer-to-peer PCU network as shown, but also represents a corresponding peer-to-peer MCU network. In such a network, the MCU system master (440a in FIG. 4) is analogous to the PCU Zone Master 550, and other MCUs will operate as zone masters and column masters, depending on their position in the network, in a similar manner to the hierarchical PCU system described herein. One difference in a peer-to-peer system for the MCU units (440 in FIG. 4) is that each MCU (440 in FIG. 4) is associated with a given row 554 of seats 506, rather than with an individual seat 506.

Figure 10:
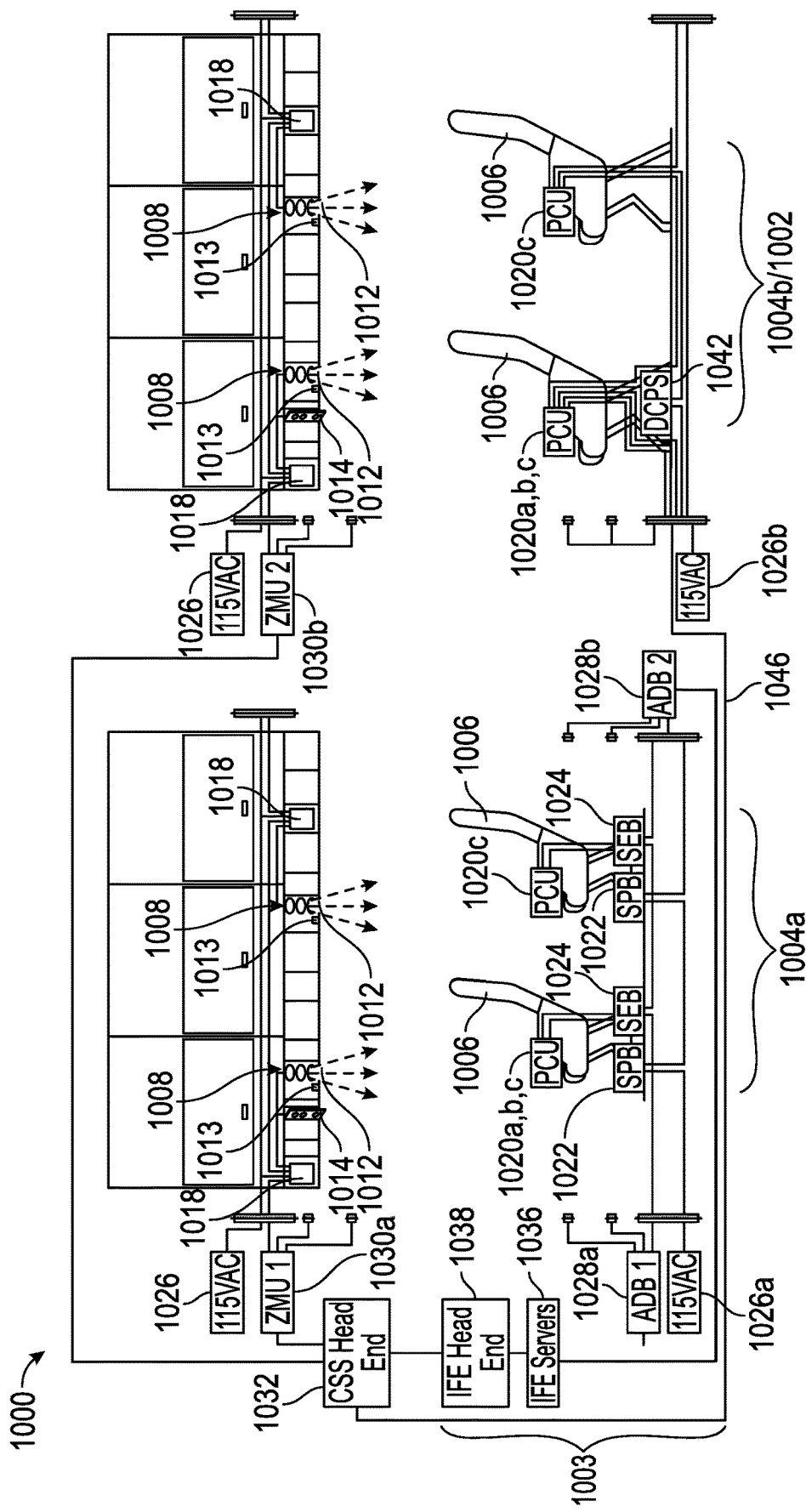
FIG. 10 is a partial side-schematic view of a portion of an aircraft cabin, showing a schematic diagram of another embodiment of a DC-based peer network in accordance with the present disclosure.
Figure 11:
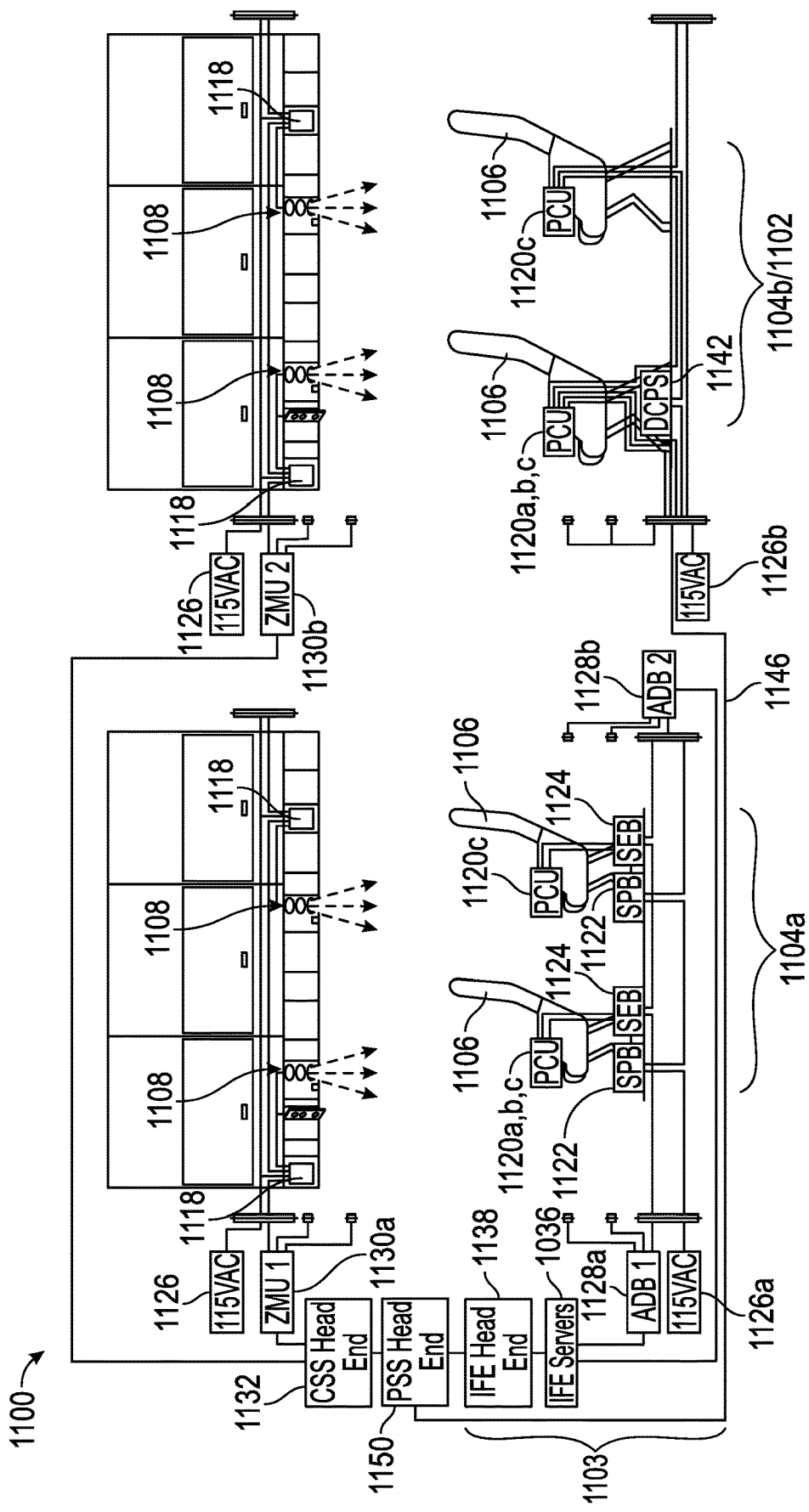
FIG. 11 is a partial side-schematic view of a portion of an aircraft cabin, showing a schematic diagram of another embodiment of a DC-based peer network in accordance with the present disclosure.
Figure 12:
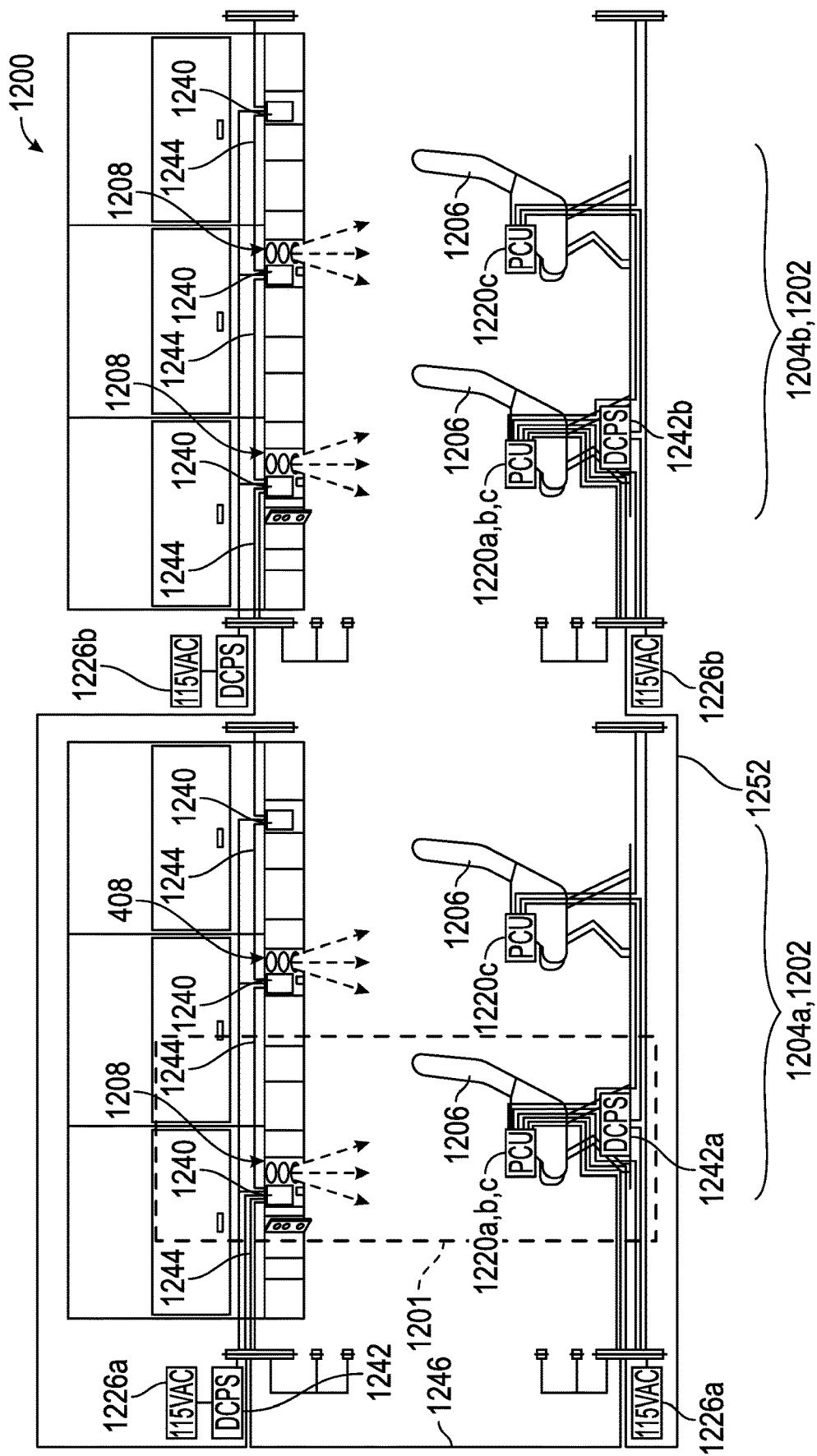
FIG. 12 is a partial side-schematic view of a portion of an aircraft cabin, showing a schematic diagram of another embodiment of a DC-based peer network in accordance with the present disclosure.

The simplified peer-to-peer system shown in FIGS. 4-9 can also be used alone or in combination with systems that incorporate In-Flight Entertainment and other CSS components like those of prior systems. Various alternative configurations of such combination systems are illustrated in FIGS. 10-12. Shown in FIG. 10 is a partial side-schematic view of an aircraft cabin 1000 having a DC-based peer-to-peer network with seats 1006 in two seating zones 1004a, b (e.g. business class and economy class). In this embodiment, at least some of the seat-based PCUs 1020 units are incorporated into a DC-based peer-to-peer network, while the overhead PSS panels 1008 are configured in the manner of prior systems, like that shown in FIG. 3.

As discussed above, the overhead PSU panel 1008 includes various overhead PSS devices discussed above, such as Reading lights 1012 and Call Lights 1013, signage 1014, etc. Power and electronic data for the electronic PSS components of each overhead PSU panel 1008 or for a group of overhead PSU panels 1008 can be provided through an overhead electronics unit (OEU) 1018. A zone management unit (ZMU), indicated generally at 1030, is coupled to and controlled by the CSS head end unit 1032, which provides data and control for all of the OEUs 1018 through their respective ZMUs 1030. In this configuration, electronic data and control for all of the OEUs 1018 in each zone 1004 is provided through a single ZMU 1030, which is associated with all three seat columns of the wide body aircraft—i.e. right, left and center columns of seats 1006—in its zone 1004. Thus, ZMU1 1030a provides control to all of the OEUs 1018 in the fore zone 1004a, and ZMU2 1030b provides control to all of the OEUs 1018 in the aft zone 1004b. As with the embodiment of FIG. 3, power to each OEU 1018 is provided via the 115 v AC power system 1026 from the aircraft power system.

Each passenger seat 1006 includes a PCU 1020, which can provide the functions discussed above. The forward zone 1004a of seats 1006 in FIG. 10 has an In-Flight Entertainment System, with PCUs 1020 configured like those of FIG. 3. Each PCU 1020 receives power from a seat power box (SPB) 1022 and data from a seat electronics box (SEB) 1024, allowing seat-to-seat communication and USB charging for personal electronic devices at each seat 1006. The PCU 1020 can also include controls for the overhead PSS devices, as discussed above. Power to the SPB 1022 and SEB 1024 for each passenger seat 1006 (and ultimately for the associated PCU 1020) in the forward zone 1004a is also provided by the aircraft 115 v AC aircraft power system 1026. The power system shown in FIG. 10 includes only a forward power connection point 1026a for the forward seat zone 1004a, and a forward power connection point 1026b for the aft seat zone 1004b.

Electronic data for all of the PCUs 1020 in the forward zone 1004a is provided through redundant fore and aft area distribution boxes ADB1 1028a and ADB2 1028b. Rather than separate ADBs 1028 for the right, left and center seat sections, only one ADB 1028a is shown at each end of the forward zone 1004a, and is associated with all three seat column portions of the wide body aircraft—i.e. right, left and center columns of seats 1006—in this zone.

The fore and aft ADB units 1028a, b, are coupled to one or more IFE servers 1036, which in turn are connected to an IFE head end unit 1038, which manages content and distribution of entertainment and other data to the SEB 1024 of each seat 1006 in the forward zone 1004a. The PCU 1020 is connected to the SEB 1024 and sends Call Light and Reading Light commands to the IFE head end unit 1038 via the SEB 1024. The IFE head end unit 1038 is connected to the CSS head end unit 1032, which in turn is connected to ZMU1 1030a, which communicates with all OEUs 1018 in the overhead PSU panels 1008 of the forward zone 1004a. With this configuration, control inputs for overhead PSS devices can be routed from individual seat PCUs 1020 to the PSS components of the associated overhead PSU panels 1008.

The aft zone 1004b in FIG. 10 does not include an In-Flight Entertainment System, but can include all features shown with respect to the embodiment of FIG. 4. Each passenger seat 1006 in this zone includes its passenger control unit (PCU) 1020, typically disposed in the armrest of the seat 1006. The PCU 1020 can allow USB charging for personal electronic devices, and can also include controls for the overhead PSS devices.

In the rear zone 1004b, the PCUs 1020 are connected in a true peer-to-peer network 1002, as discussed above. Power for all PCUs 1020 in the aft zone 1004 is provided via one or more DCPS units 1042 that are connected to the 115 v AC aircraft power supply 1026, thus providing DC power to all of the PCUs 1020. While, a single DCPS 1042 is shown providing power to all PCUs 1020 in the aft zone 1004b, it is to be appreciated that any number of DCPS units 1026 can be used in a given zone 1004. The PCUs 1020 can be identical units like that shown in FIG. 6, and are interconnected in a hierarchical peer-to-peer network, as discussed above. Each PCU 1020 is configured to control the data, communications and other functions for its associated seat 1006.

Zone master PCUs 1020a, column master PCUs 1020b, row master PCUs 1020c and seat-to-seat PCUs 1020 are connected together to provide the functions discussed above. The zone master PCU 1020a for each zone 1004 is communicatively coupled to the CSS head end unit 1032, and interfaces with all external systems for data handling. Thus, in the aft zone 1004b of the system of FIG. 10 there are no seat power boxes (SPBs) and seat electronics boxes (SEBs) for each seat 1006, thus greatly reducing weight and complexity. A single data connection cable 1046 extends from the aft zone master PCU 1020a to the CSS head end unit 1032, which is also connected to ZMU2 1030b for the aft zone 1004b, allowing control signals to be transmitted between the PCUs 1020 in the aft zone 1004 and the OEUs 1018 of the overhead panel system units 1008 of the aft zone 1004b. This allows any passenger in any seat in the aft zone 1004b to control their corresponding overhead PSU panel 1008 using the PCU 1020 of their particular seat.

Shown in FIG. 11 is a partial side-schematic view of another embodiment of an aircraft cabin 1100 having a DC-based peer-to-peer network with seats 1106 in two seating zones 1104a, b. Like the embodiment of FIG. 10, the overhead PSU panels 1108 are configured in the manner of prior systems, and include the overhead PSS devices such as Reading lights and Call Lights. Power and electronic data for the electronic components of each overhead PSU panel 1108 or for a group of overhead PSU panels 1108 in both zones 1104a, b are provided through an overhead electronics unit (OEU) 1118. A zone management unit (ZMU) 1130 is coupled to and controlled by the CSS head end unit 1132, which provides data and control for all of the OEUs 1118 through their respective ZMUs 1130. In this configuration, electronic data and control for all of the OEUs 1118 in each zone 1104 is provided through a single ZMU 1130, which is associated with all three seat column portions of the wide body aircraft in its zone 1104. Thus, ZMU1 1130a provides control to all of the OEUs 1118 in the fore zone 1104a, and ZMU2 1130b provides control to all of the OEUs 1118 in the aft zone 1104b. As with the embodiment of FIG. 3, power to each OEU 1118 is provided via the 115 v AC power 1126 from the aircraft power system.

Also like FIG. 10, each passenger seat 1106 in FIG. 11 includes a PCU 1120, with the aft seat PCUs 1120 incorporated into a DC-based peer-to-peer network 1102. Each passenger seat 1106 includes a PCU, which can provide the functions discussed above. The forward zone 1104a of seats 1106 in FIG. 11 has an In-Flight Entertainment System 1103, with a PCU system configured like that of FIG. 3. Each PCU 1120 receives power from a seat power box (SPB) 1122 and data from a seat electronics box (SEB) 1124, allowing seat-to-seat communication and USB charging for personal electronic devices at each seat 1106. The PCU 1120 can also include controls for the overhead PSS devices, as discussed above. Power to the SPB 1122 and SEB 1124 boxes for each passenger seat 1106 (and ultimately for the associated PCU 1120) in the forward zone 1104a is also provided by the aircraft 115 v AC aircraft power system 1126. The power system shown in FIG. 11 includes only a forward power connection point 1126a for the forward seat zone 1104a, and a forward power connection point 1126b for the aft seat zone 1104b.

Electronic data for all of the PCUs 1120 in the forward zone 1104a is provided through redundant fore and aft area distribution boxes ADB1 1128a and ADB2 1128b. Rather than separate ADBs 1128 for the right, left and center seat sections, only one ADB is shown at each end of the forward zone 1104a, and is associated with all three seat column portions of the wide body aircraft in this zone.

The fore and aft ADB units 1128 are coupled to one or more IFE servers 1136, which in turn are connected to an IFE head end unit 1138, which manages content and distribution of entertainment and other data to the SEBs 1124 of each seat 1106 in the forward zone 1104a. The PCUs are connected to the SEBs and send Reading Light and Call Light commands to the IFE Head End 1138 via the SEBs 1124. The IFE head end unit 1138 is connected to the CSS Head End 1132, which in turn is connected to ZMU1 1130a, which communicates with all OEUs 1118 in the overhead PSU panels 1108 of the forward zone 1104a. With this configuration, control inputs for overhead PSS devices can be routed from individual seat PCUs 1120 to the components of the associated overhead PSU panel 1108.

In the rear zone 1104b of seats 1106, the PCUs 1120 are structurally identical units connected in a true peer-to-peer hierarchical network, as discussed above. Power for all PCUs 1120 in the aft zone 1104b is provided via one or more DCPS units 1142 that are connected to the 115 v AC aircraft power supply 1126, thus providing DC power to all of the PCUs 1120. While, a single DCPS 1142 is shown providing power to all PCUs 1120 in the aft zone 1104b, it is to be appreciated that any number of DCPS units 1142 can be used in a given zone 1104.

Each passenger seat 1106 includes its passenger control unit (PCU) 1120, typically disposed in the armrest of the seat. The PCU 1120 can allow USB charging for personal electronic devices and can also include controls for the overhead PSS devices. Unlike the embodiment of FIG. 10, however, each PCU 1120 in the aft zone 1104b is coupled through a passenger services system (PSS) head end unit 1150. That is, the data cable 1146 connected to the zone master PCU 1120a in the aft zone 1104b is coupled to the PSS head end unit 1150, which provides a standard interface for all external systems (e.g. ARINC 628 Part B for interfacing to the CSS). The aft zone 1104b in FIG. 11 is substantially similar to the forward zone 1104a, but without the IFES. The commands from each PCU 1120 can still be routed to the CSS by way of the peer-to-peer network 1102.

The PSS head end unit 1150 is connected to the CSS head end unit 1132, which is also connected to ZMU2 1130b for the aft zone 1104b, allowing control signals to be transmitted between the PCUs 1120 in the aft zone 1104b and the corresponding overhead OEUs 1118 and panel units 1108 of the aft zone 1104. This allows any passenger in any seat 1106 in the aft zone 1104b to control their corresponding overhead PSU panel 1108 using the PCU 1120 of their particular seat.

Though not separately shown, other peer-to-peer system configurations can be created using various combinations of elements shown in the figures herein. For example, a peer-to-peer system can be configured using overhead PSS components configured like the overhead PSU system 402 of FIG. 4, in combination with an entertainment system like the IFES 1103 shown in FIG. 11. In such a system, each seat or row 1106 would have overhead PSU devices controlled by an MCU (e.g. MCU 440 in FIG. 4), rather than the configuration in FIG. 11 in which a group of overhead PSU panels 1108 are controlled by an OEU 1118, in the manner of prior overhead systems (e.g. as shown in FIGS. 2 and 3). Other combinations can also be used.

Shown in FIG. 12 is a partial side-schematic view of another embodiment of a PSS 1201 having DC-based peer network in accordance with the present disclosure. In this embodiment, the seats 1206 in the cabin 1200 are arranged in two seating zones 1204a, b. However, unlike the embodiments of FIGS. 10 and 11, both zones 1204a and 1204b are configured in a true peer-to-peer network 1202 for both the seat-based PCUs 1220 and the overhead PSS panels 1208. The configuration shown in FIG. 12 does not include an In-Flight Entertainment System, but does include USB connections at each PCU 1220. The overhead PSU panel 1208 includes the overhead Reading lights and Call Lights that are part of the PSS 1201, as discussed above.

Rather than an OEU for each overhead PSU panel 1208 or group of overhead PSU panels 1208, each overhead PSU panel 1208 includes a discrete microcontroller unit (MCU) 1240 having a processor and system memory, like the MCU 440 discussed above with respect to FIGS. 4 and 6. Power for all MCUs 1240 is provided from a DC power source (DCPS) 1242 that is connected to the 115 v AC aircraft power supply 1226, thus providing DC power to all of the MCUs 1240 and the associated overhead PSS devices of the overhead PSU panel 1208. While a single DCPS 1242 can provide power to all MCUs 1240 in a given zone 1204, fore and aft DCPS units 1242 can be provided in a given zone 1204 to provide a power supply for respective zones of a column, in the manner discussed above.

All of the MCUs 1240 in a given zone 1204 have data connection cables 1244 that are coupled in a hierarchical daisy-chain fashion with adjacent MCU units 1240 in each seat zone 1204. This allows unique data and commands to be sent to or from one MCU 1240 to the next MCU 1240, in either direction, until they reach any destination MCU in the zone 1204 or to any PCU 1220 in the system, as described below The MCUs 1240 can be structurally and functionally identical microprocessor devices, as discussed above, with hierarchical data transfer logic programming stored in their associated memory. Each MCU 1240 functions depending upon its location in the hierarchical connection structure, thus creating a peer-to-peer network among the MCUs 1240 that functions in the manner discussed above with respect to FIG. 4.

Each passenger seat 1206 in FIG. 12 includes a PCU 1220, which includes all of the features and functionality discussed above with respect to FIG. 6. Power for any or all PCUs 1220 in each zone 1204 is provided from one or more DCPS units 1242 that are connected to the 115 v AC aircraft power supply 1226. As shown in FIG. 12, the forward zone 1204a includes a first DCPS 1242a and the aft zone 1204b includes a second DCPS 1242b. As noted above, however, any number of DCPS units 1242 can be used in any given zone 1204. The PCUs 1220 in each zone 1204 are interconnected in a hierarchical peer-to-peer network, as discussed above, with each zone 1204 having a zone master PCU 1220a, having a standard interface for all external systems (e.g. ARINC 628 Part B for interfacing to the CSS), the zone master PCU 1220a being connected to column master PCUs 1220b, which are connected to row master PCUs 1220c, which are finally connected to PCUs 1220 in a given seat 1206 in seat-to-seat fashion, as shown in FIGS. 5-9.

In sum, the DC-based peer network disclosed herein facilitates a Passenger Services System that can include in-flight entertainment, seat-to-seat communication and USB charging for personal electronic devices at each passenger seat with a significant reduction in hardware and wiring. By using DC power and two-conductor differential communication hardware between seat groups, columns, and zones in an aircraft, component count is reduced by routing power and data directly to passenger control units at each seat without the need for intermediate controllers to condition power and aggregate data. The network can be implemented within seats, within overhead electronics, or as a combination of the two, while interfacing with other Cabin Management Systems as desired.

The system disclosed herein addresses the prior approach of dedicated data aggregators (e.g. Seat Electronics Boxes) and/or Power Modules in each seat group by enabling lightweight point-to-point power and data delivery between Control Units. This system reduces weight by eliminating aggregating and conditioning equipment at each seat. It reduces component count by eliminating hardware and associated connectors and wiring. It provides Control Units that perform power management functions formerly handled by multiple separate Power Modules. This system is also capable of managing USB charging for Portable Electronic Devices, and has the ability to communicate to other systems using aviation standard communication protocols, such as ARINC 628 Part 3.

For overhead PSU panels this system reduces the size and complexity of electrical distribution networks and hardware, such as high speed data distribution systems to control reading lights. Instead, this system enables each overhead PSU panel to have its own controller, thereby extending its features beyond discrete control to include a wider range of customizable capabilities. This system also enables a Seat System to communicate directly with an Overhead System without the use of a dedicated Cabin Services System. This system also simplifies diagnostics by enabling each LRU have the ability to manage network traffic, and can be enabled to serve its own Maintenance screens to external Web Based Systems for use by maintenance personnel.

Figure 13:
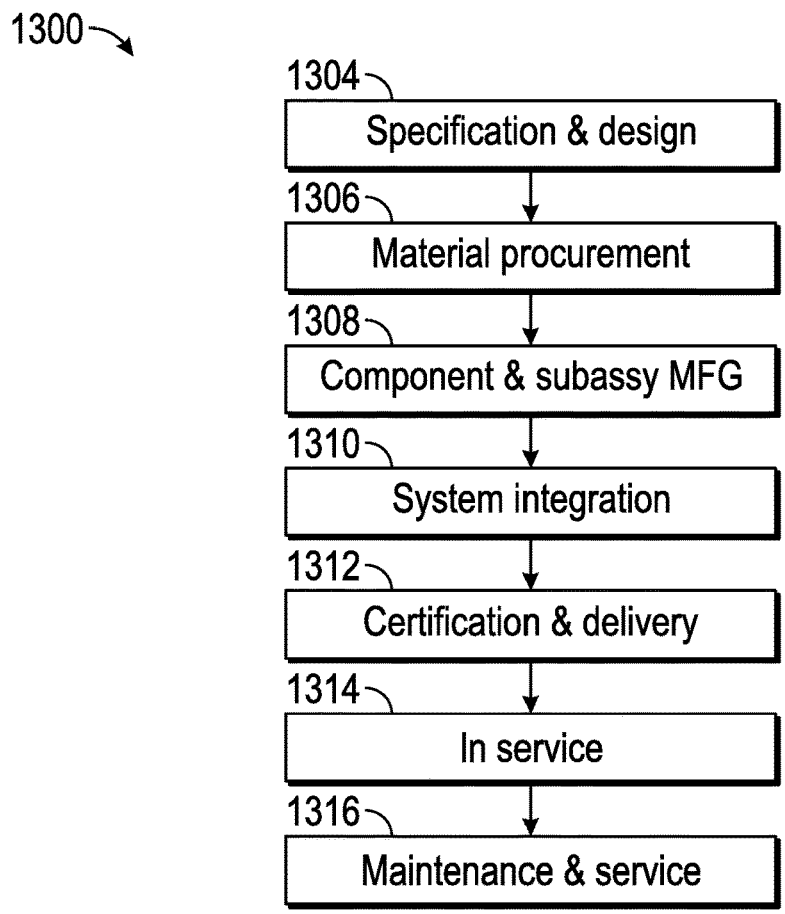
FIG. 13 is a flow diagram of an aircraft production and service methodology.
Figure 14:
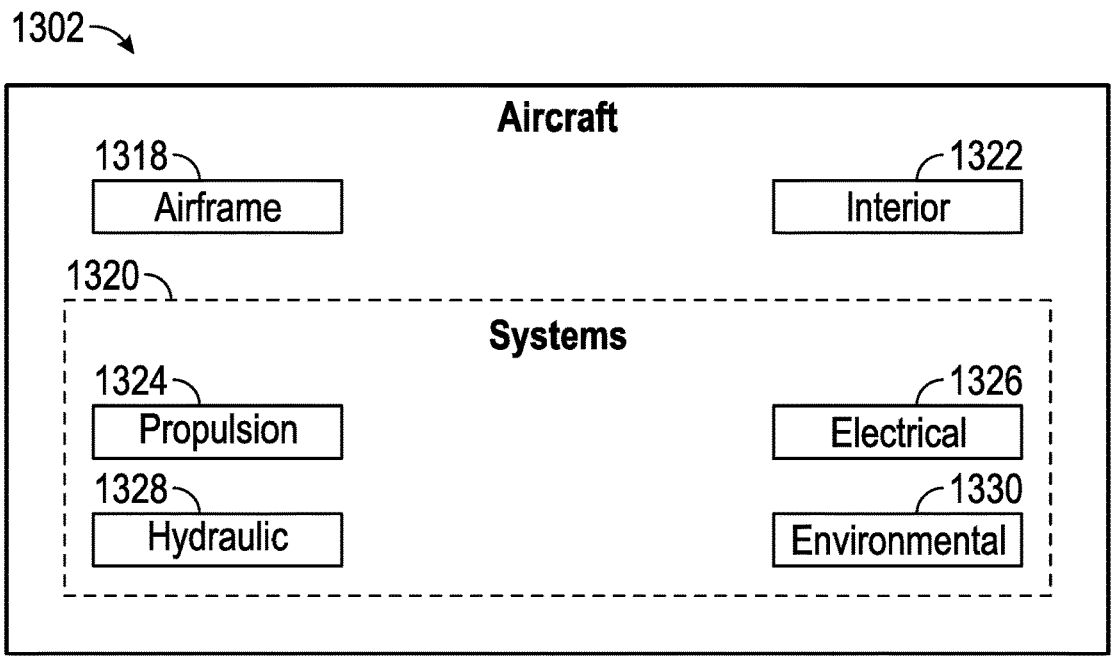
FIG. 14 is a block diagram of an aircraft.

Embodiments of the disclosure may be described in the context of an aircraft manufacturing and service method 1300 as shown in FIG. 13, for an aircraft 1302 as shown in FIG. 14. During pre-production, exemplary method 1300 may include specification and design 1304 of the aircraft 1302 and material procurement 1306. During production, component and subassembly manufacturing 1308 and system integration 1310 of the aircraft 1302 takes place. Thereafter, the aircraft 1302 may go through certification and delivery 1312 in order to be placed in service 1314. While in service by a customer, the aircraft 1302 is scheduled for routine maintenance and service 1316 (which may also include modification, reconfiguration, refurbishment, and so on).

Each of the processes of method 1300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 14, an aerospace vehicle such as an aircraft 1302 produced by exemplary method 1300 may include an airframe 1318 with a plurality of systems 1320 and an interior 1322. Examples of high-level systems 1320 include one or more of a propulsion system 1324, an electrical system 1326, a hydraulic system 1328, and an environmental system 1330. Any number of other systems may be included. Although an aircraft is given as an example of an aerospace application for the present disclosure, it is to be understood that this is only one example of an aerospace application. Additionally, while an aerospace example is shown, the principles of the disclosure may be applied to other industries, such as the automotive industry, for example.

Although various embodiments have been shown and described, the present disclosure is not so limited and will be understood to include all such modifications and variations are would be apparent to one skilled in the art.

What is claimed is:

1. A passenger control unit (PCU), configured for association with a passenger seat of an aircraft having passenger seats arranged in a plurality of zones, each zone having at least one column of seats, and each column having at least one row of seats, the PCU comprising:
    a processor and system memory, the processor being programmed for differential peer-to-peer communication with adjacently interconnected PCUs throughout a hierarchical data network and with an external system of the aircraft, wherein the hierarchical data network includes respective PCUs associated with each passenger seat, wherein one PCU of one seat of each row is serially coupled to all PCUs of a respective row, and designated as a row master PCU, wherein one PCU of one seat of each column is serially coupled to all row master PCUs of a respective column, and designated as a column master PCU, and wherein one PCU of one seat of each zone is serially coupled to all column master PCUs of a respective zone, and designated as a zone master PCU;
    a passenger operable controller for the external system;
    a standard data and power interface, couplable to a direct current (DC) power source, having a plurality of two-wire data interfaces for receiving and transmitting data with the adjacently interconnected PCUs, whereby any PCU is interchangeable with any other PCU within the hierarchical data network, and functions as the row master PCU when serially coupled to all PCUs in the respective row, as the column master PCU when serially coupled to all PCUs in the respective column, and as the zone master PCU when serially coupled to all column master PCUs in the respective zone.

2. The PCU of claim 1, wherein the passenger operable controller is selected from the group consisting of a reading light controller and an attendant call button.

3. The PCU of claim 1, further comprising a universal serial bus (USB) power and data outlet, the processor being configured for USB power management.

4. The PCU of claim 1, wherein the standard data and power interface further comprises an inter-system data interface, a zone-to-zone data interface, a column-to-column data interface, a seat group-to-seat group interface, and a seat-to-seat interface.

5. The PCU of claim 1, wherein the standard data and power interface includes at least one power output interface for providing DC power to the adjacently interconnected PCU.

6. The PCU of claim 1, wherein the PCU is configured to be disposed in an armrest of the passenger seat.

7. The PCU of claim 1, wherein the PCU is configured to be directly connected to a DC power supply device.

8. The PCU of claim 1, wherein the external system is selected from the group consisting of a cabin services system, an in-flight entertainment system, and a passenger services system.

9. The PCU of claim 1, wherein the external system comprises:
    a plurality of overhead passenger services units (PSU), one PSU associated with each row of passenger seats;
    at least one overhead passenger services system (PSS) device associated with each overhead PSU; and
    a microcontroller unit (MCU), associated with each overhead PSU, the MCUs coupled to a DC power distribution system and interconnected to each other in a hierarchical MCU peer-to-peer network with two-conductor data wires, each MCU having an MCU processor and system memory and a standard data and power interface, the MCU processor being programmed for differential peer-to-peer communication with adjacently interconnected MCUs throughout the MCU peer-to-peer network, one MCU designated as an MCU system master.

10. The PCU of claim 1, further comprising a voltage regulator configured to compensate for power fluctuations at the PCU.

11. An aircraft comprising:
    a cabin services system (CSS);
    an in-flight entertainment system (IFES);
    a passenger control unit (PCU) network, distinct from the CSS and from the IFES, comprising a plurality of wired passenger control units (PCUs), each PCU having a processor and system memory and a standard data and power interface, the processor being programmed for differential peer-to-peer communication with adjacently interconnected PCUs throughout the PCU network and with the CSS system, the IFES system, or both; and passenger seats arranged in a plurality of zones, each zone having at least one column of seats, and each column having at least one row of seats, wherein each passenger seat is associated with a respective PCU of the plurality of PCUs, wherein one PCU of one seat of each row is serially coupled to all PCUs in a respective row, and designated as a row master PCU, wherein one PCU of one seat of each column is serially coupled to all row master PCUs in a respective column, and designated as a column master PCU, wherein one PCU of one seat of each zone is serially coupled to all column master PCUs in a respective zone, and designated as a zone master PCU.

12. The aircraft of claim 11, wherein one zone master PCU is designated as a PCU system master and connected to the CSS system, the IFES system, or both.

13. The aircraft of claim 11, further comprising two-conductor data wires coupling all PCUs within the PCU network.

14. The aircraft of claim 11, further comprising a DC power distribution system including a plurality of DC power supply devices (DCPS), at least one of the PCUs being directly connected to the DCPS.

15. The aircraft of claim 14, wherein each PCU is configured to transmit DC power via a power transmission line to the adjacently interconnected PCU.

16. The aircraft of claim 14, wherein each zone master PCU, row master PCU, and column master PCU is connected directly to the DCPS.

17. The aircraft of claim 11, wherein each PCU includes a universal serial bus (USB) power and data outlet, and the processor is configured for USB data management.

18. The aircraft of claim 11, wherein each of the PCUs is coupled to the IFES and receives DC power and data via the IFES.

19. The aircraft of claim 11, wherein each of the PCUs is mounted in an armrest of the associated passenger seat, and includes passenger operable controllers for a reading light and an attendant call light.

20. The aircraft of claim 11, wherein each of the PCUs includes a voltage regulator configured to compensate for power fluctuations at the PCU.

* * * * *